(12) United States Patent
Thomas

(10) Patent No.: US 10,565,896 B2
(45) Date of Patent: Feb. 18, 2020

(54) DIETARY PORTIONS SYSTEM AND METHOD FOR HEALING METABOLIC DAMAGE

(71) Applicant: Aileen Thomas, Palo Alto, CA (US)

(72) Inventor: Aileen Thomas, Palo Alto, CA (US)

( * ) Notice: Subject to any disclaimer, the term of this patent is extended or adjusted under 35 U.S.C. 154(b) by 289 days.

(21) Appl. No.: 15/866,448

(22) Filed: Jan. 9, 2018

(65) Prior Publication Data

US 2018/0137777 A1    May 17, 2018

Related U.S. Application Data

(63) Continuation-in-part of application No. 15/362,482, filed on Nov. 28, 2016, now abandoned.

(60) Provisional application No. 62/297,850, filed on Feb. 20, 2016.

(51) Int. Cl.
| | |
|---|---|
| *G09B 19/00* | (2006.01) |
| *G09B 5/02* | (2006.01) |
| *G09B 7/06* | (2006.01) |
| *G09B 7/10* | (2006.01) |
| *G06F 17/12* | (2006.01) |

(52) U.S. Cl.
CPC .......... *G09B 19/0092* (2013.01); *G09B 5/02* (2013.01); *G09B 7/06* (2013.01); *G09B 7/10* (2013.01); *G06F 17/12* (2013.01)

(58) Field of Classification Search
None
See application file for complete search history.

(56) References Cited

U.S. PATENT DOCUMENTS

| | | |
|---|---|---|
| 2012/0179665 A1 | 7/2012 | Baarman et al. |
| 2014/0005575 A1* | 1/2014 | Ogawa ................. A61B 5/1118 600/595 |
| 2014/0236759 A1 | 8/2014 | Mirabile |
| 2014/0287384 A1* | 9/2014 | Boyes ................ G06F 19/3475 434/127 |

OTHER PUBLICATIONS

American Academy of Environmental Medicine. Genetically Modified Foods.
Brady, Dennis. "FDA has allowed antibiotics in animal feed despite risk to human health, report says." The Washington Post. Jan. 27, 2014.

(Continued)

*Primary Examiner* — Paul A D'Agostino
(74) *Attorney, Agent, or Firm* — Christopher Pilling

(57) ABSTRACT

A process for providing a list of user queries, wherein the list of user queries includes a weight query, an age query, and a physical activity query, wherein the physical activity query comprises a plurality of activity levels including sedentary, moderate, and heavy; determining a metabolic factor based on the list of user queries, wherein the metabolic factor comprises building, balancing, and extra building, each having a different ratio of macronutrient categories of carbohydrates, proteins, and fats; and generating a Portions Profile based on the list of user queries and the metabolic factor, wherein a Portions Profile comprises a daily recommended amount of protein, carbohydrates, fats, fluids, and cultured food/drink to promote metabolic healing.

4 Claims, 20 Drawing Sheets

(56) References Cited

OTHER PUBLICATIONS

California Department of Pesticide Regulation. Pesticide Safety Rules for Farmworkers. p. 1, 2, 3.
Dorfner, Micah. Are you getting too much protein? Mayo Clinic. Feb. 23, 2017. p. 1.
Indiana University Health. Carbohydrate Counting Food List.
Mercola, M.D. Joseph. Fat for Fuel. Hay House Inc. Carlsbad, CA 2016. p. 9.
Material Safety Data Sheet. Ammonium Sulfate. Santa Cruz Biotechnology.
Material Safety Data Sheet. Butylated Hydroxy Anisole. Fisher Scientific.
Material Safety Data Sheet. Butylated hydroxytoluene (BHT). Santa Cruz Biotechnology Inc.
Material Safety Data Sheet. Potassium Bromate. ScienceLab.com.
Material Safety Data Sheet. Sodium Nitrite. ScienceLab.com.
National Academy of Science. NAS Panel: Only Safe Intake of Trans Fat is Zero. Jul. 10, 2002.
Schwarzbein M.D., Diana. The Schwarzbein Principle II: The Transition. Health Communications Inc. Deerfield Beach, FL. 2002. pp. 1-16, 96, 97, 99, 228-229.
Sears, Ph.D., Barry. The Zone. Harper-Collins Publishers. New York, NY. 1995. pp. 3, 71.
U.S. Environmental Protection Agency. Setting Tolerances for Pesticide Residues in Foods.
U.S. Centers for Disease Control National Biomonioring Program. Organochlorine Pesticides Overview.
U.S. Centers for Disease Control. Antibiotic Resistance Threats in the United States, 2013. p. 11. U.S. Food and Drug Administration. Trans Fat.

\* cited by examiner

FIG. 10B

| Food | Serving | Portion(s) | | Modify | Delete |
|---|---|---|---|---|---|
| Salmon, king | 3 oz. | 2.0 portions | Protein | ✎ | ▦ |
| | | 0.33 portions | Monounsaturated Fat | | |
| | | 0.13 portions | Omega-3 Fat | | |
| Rice, brown, cooked | 0.33 cup | 0.66 portions | Grain/Legume | ✎ | ▦ |
| | | 0.13 portions | Protein | | |
| | | 0.02 portions | Monounsaturated Fat | | |
| | | 0.02 portions | Omega-6 Fat | | |
| | | 0.01 portions | Saturated Fat | | |
| Broccoli, raw or cooked | 0.5 cup | 0.67 portions | Crunchy Vegetable | ✎ | ▦ |
| Carrots, raw or cooked | 0.5 cup | 0.67 portions | Crunchy Vegetable | ✎ | ▦ |
| Butter | 0.5 tbsp. | 0.4 portions | Saturated Fat | ✎ | ▦ |
| | | 0.16 portions | Monounsaturated Fat | | |
| | | 0.02 portions | Omega-6 Fat | | |

1006 → Food
1007 → Serving
1008 Portion(s)
1009 Add My Food

Macro Portion Categories* 1203

Food Categories Under Each Macro Portion Category 1204

| MY PORTIONS PROFILE: TODAY  YESTERDAY | ADD A FOOD I ATE: TODAY  YESTERDAY | VIEW/EDIT FOODS I ATE: TODAY  YESTERDAY | PORTIONS PROFILES: LAST 14 DAYS | RECIPES: CREATE  VIEW/EDIT | TRACK MY PROGRESS |

Create a Recipe

Recipe Name  [ Smoothie ] 1201

Number of Servings [ 1 ] 1202

[ Update Servings ]

Remember:
Magic Healing Formula = Carb + Protein + Fat    1206

Add the Ingredients in Your Recipe that Drive the Portions ❓
Each time you click on a food category button, a new row will be added for your selection.

| PROTEIN | CARBOHYDRATES | FAT | FLUIDS |
|---|---|---|---|
| Meat  Seafood  Egg  Dairy Protein  Soy | Grain/Legume  Vegetable  Fruit  Sweetener | Nut/Seed  Dairy Fat  Oil/Other Fat | Nourishing Fluid  Nut/Grain Milk |

SAUCES / CONDIMENTS

[ Sauces and Condiments ]  1205

Ingredient          Quantity            Portion per Serving         Modify   Delete
[      ] 1207   [      ] 1208       [      ] 1209                 ↻          🗑

1210  [ Preview Portions for 1 Serving in Portions Profile ]   [ Save My Recipe ] ← 1211

| Ingredient | Quantity | Portion per Serving | | Modify | Delete |
|---|---|---|---|---|---|
| Spinach, raw | 4.0 cup | 5.33 portions | Leafy Vegetable | ✎ | ▦ |
| Blueberries | 0.3 cup | 0.4 portions | Fruit | ✎ | ▦ |
| Strawberries | 0.3 cup | 0.3 portions | Fruit | ✎ | ▦ |
| Cacao powder, raw | 0.5 tbsp. | 0.15 portions | Extra Carbohydrate | ✎ | |
| | | 0.08 portions | Protein | | |
| | | 0.03 portions | Saturated Fat | | |
| | | 0.01 portions | Monounsaturated Fat | | |
| | | 0.01 portions | Omega-6 Fat | | |
| Flax seeds (O-3) | 2.0 tbsp. | 0.44 portions | Omega-3 Fat | ✎ | ▦ |
| | | 0.3 portions | Protein | | |
| | | 0.3 portions | Omega-3 Fat | | |
| | | 0.11 portions | Monounsaturated Fat | | |
| | | 0.09 portions | Omega-6 Fat | | |
| | | 0.06 portions | Saturated Fat | | |
| Flax oil (O-3) | 2 tsp. | 0.56 portions | Omega-3 Fat | ✎ | ▦ |
| | | 0.22 portions | Monounsaturated Fat | | |
| | | 0.11 portions | Saturated Fat | | |
| Whey Protein Concentrate | 1.0 tbsp. | 0.75 portions | Protein | ✎ | ▦ |

Preview Portions for 1 Serving in Portions Profile | Save My Recipe

FIG. 12B

| Portion Macro Categories and Corresponding Food Categories | Primary (X) and Secondary (x) Portion Categories ||||||||||
|---|---|---|---|---|---|---|---|---|---|---|
| | CARBOHYDRATE ||||| PROTEIN | FAT |||| FLUID |
| | Grain/ Legume | Starchy Veg. | Leafy Veg. | Crunchy Veg. | Fruit | Other Carb | Protein | Saturated | Monoun- saturated | O-3 | O-6 | |
| PROTEIN | | | | | | | | | | | | |
| Meat | | | | | | | X | x | x | | x | |
| Seafood | | | | | | | X | x | x | x | x | |
| Egg, large | | | | | | | X | x | x | x | x | |
| Dairy | | | | | | x | X | X | x | | x | |
| Soy | | | | | | x | X | x | x | x | x | |
| CARBS | | | | | | | | | | | | |
| Grain | X | | | | | | x | | | | | |
| Legume | X | | | | | | x | | | x | x | |
| Vegetable | | X | X | X | | | | | | | | |
| Fruit | | | | | X | | | | | | | |
| Sweetener | | | | | | X | | | | | | |
| FATS | | | | | | | | | | | | |
| Nut/Seed | | | | | | x | x | x | x | X | X | |
| Dairy | | | | | | x | x | X | x | x | x | |
| Oil/Other | | | | | | | x | X | X | X | X | |
| FLUIDS | | | | | | | | | | | | |
| Nourishing | | | | | | x | | | | | | X |
| Nut/Grain Milk | | | | | | x | x | | | | | X |

FIG. 13

DIETARY PORTIONS SYSTEM AND METHOD FOR HEALING METABOLIC DAMAGE

CROSS-REFERENCE TO RELATED APPLICATIONS

The present application is a continuation-in-part application which claims priority to U.S. patent application Ser. No. 15/362,482, filed on Nov. 28, 2016, entitled "Process for generating a portions profile based on user queries" which claims priority to U.S. Provisional Patent Application Ser. No. 62/297,850, filed on Feb. 20, 2016 entitled "Process for generating a portions profile based on user queries", the disclosures of which are hereby incorporated their entirety at least by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention relates to a dietary Portions System and method for healing metabolic disease.

Background of the Invention

Metabolic damage is a serious and insidious lifestyle-induced disease that can severely impact a person's quality of life and, in advanced stages, be life-threatening. "Lifestyle-induced" means metabolic damage is the result of an individual's daily habits, a primary influencer being a poor-quality diet.

As endocrinologist Diana Schwarzbein, M.D., explains, "To keep your body alive and functioning well, you need to have chemicals that are used for structure, function and energy. These chemicals are known as biochemicals . . . Your body is made up of all these biochemicals that are continuously undergoing chemical reactions in order to carry on all the functions of the body . . . . The combination of using up and rebuilding biochemicals is called regeneration . . . What you use up you must replenish, and you get the materials you need to rebuild your biochemicals from the food you eat. The sum of these regeneration reactions, all the using-up reactions plus all the building-up reactions that are occurring, is what you know as your metabolism" (*The Schwarzbein Principle II: The Transition*, (hereafter, "Schwarzbein") pg. 12).

According to Dr. Schwarzbein, "You have an efficient metabolism if all of these chemical reactions are occurring on a continuous basis and you rebuild just as many biochemicals as you use up./Every system and function in the body is connected, so when these chemical reactions occur efficiently your metabolism runs efficiently . . . When regeneration is not efficient . . . premature disease and death occur because of accelerated metabolic aging" (Schwarzbein pg. 12-13).

Symptoms of metabolic damage are often conditions thought to be "stand-alone" illnesses that include but are not limited to unhealthy (under/over) weight, abnormal cholesterol, high blood pressure, low energy, irritability, poor sleep, skin conditions, chronic pain unrelated to injury, digestive disorders, allergies, osteoarthritis, obesity, insulin resistance, type II diabetes, osteoporosis, and certain types of cancer.

Without intervention, metabolic damage worsens over time. Because metabolic damage is lifestyle-induced, it can be healed through changes in both what and how an individual eats. That is, while eating quality food is critical, it is not the only factor. Knowing how much of what to eat, and in what combinations, is essential for metabolic healing.

BRIEF SUMMARY OF THE INVENTION

The Portions System described herein consists of a process that

First presents the user with a series of queries containing basic health questions such as age, current weight, ideal weight, and daily activity level, as well as questions to provide an overview of the user's metabolic condition.

The system then uses this information to customize a Portions Profile that contains all of the portions of a broad variety of foods to eat over the course of a day. Unlike a system that provides the user with a certain amount of calories to eat over a day, the Portions System is comprehensive and unambiguous. Unlike a system that simply provides the user with an interface to enter and track foods eaten, and may even categorize foods into the three macronutrient groups, the Portions System breaks down the macronutrient groups into subgroups and shows the user how to combine subgroups to ensure balance and variety. Unlike a system that provides a database of millions of foods that intermingle whole foods and unhealthy packaged refined foods without differentiating between them, the Portions System database clearly distinguishes between healthy and unhealthy foods so the user learns to distinguish between healthy and unhealthy foods as well as learns the health impact of such foods by providing a table of reasons a refined food is unhealthy.

The system then enables the user to enter food eaten through a highly intuitive and streamlined user interface.

The system then calculates the portions associated with the food eaten.

The system then fills the portions eaten into the user's Portions Profile, enabling the user to see how much of what was eaten in a clear, dynamic, graphical image to assess quality, balance, and variety.

The system includes a recipe developer that, unlike other recipe apps that allow users to create recipes without regard to whether they contain quality food, are balanced or varied, or show the recipe in the context of a Portions System that is customized to a user's unique metabolic needs; enables a user to create recipes for meals and snacks that are balanced, varied, and conform to the user's portions profile, thereby ensuring the meals eaten conform to the user's unique metabolic needs.

This system thereby ensures not only that the user eats in a way that heals at the metabolic level, but, in conjunction with its companion Eat2Heal video series, also teaches the user about the importance of food quality, what a healthy portion of any given food is, how much variety is needed, how to mix and match portions to create balanced meals and snacks, and how to make his or her portions last over an entire day.

In one embodiment of the present invention, a process is provided comprising steps: (a) providing a list of user queries, wherein the list includes a weight query, an age query, and a physical activity query, wherein the physical activity query comprises a plurality of activity levels including sedentary, moderate, and heavy; (b) determining a metabolic factor based on the list of user queries, wherein the metabolic factor comprises balancing, building, and extra building, each factor having a different ratio of the macronutrient categories carbohydrates, proteins, and fats tailored to different metabolic needs; (c) generating a Portions Profile based on the list of user queries and the metabolic factor, wherein the Portions Profile comprises recommended daily portions of protein, carbohydrates, fats; fluids, and cultured food and beverages to promote metabolic healing; (d) providing a process for entering foods eaten, converting those foods to portions, and applying those portions to the user's Portions Profile; and (e) providing a process for creating recipes for meals and snacks that are balanced, varied, and conform to the user's Portions Profile.

In one embodiment, in step (a), the weight query includes a current weight query value and ideal weight query value. In one embodiment, an adjusted weight value based on the current weight query value and ideal weight query value is provided, wherein the adjusted weight value is used to generate the Portions Profile. In another embodiment, the adjusted weight value is equal to the current weight query value when the current weight equals the ideal weight query value. In one embodiment, the adjusted weight value is equal to the ideal weight query value when the current weight is within 30 lbs. of the ideal weight query value. In one embodiment, the adjusted weight value is equal to the current weight query value less 30 lbs. when the current weight is greater than 30 lbs. of the ideal weight query value. In one embodiment, the plurality of activity levels may adjust the ideal weight query value. In one embodiment, sedentary does not adjust the ideal weight query value, moderate adjusts the ideal weight query value by an additional 8 lbs., and heavy adjusts the ideal weight query value by an additional 15 lbs. Because the user's ideal weight affects the selection of the user's Portions Profile, the adjustments to ideal weight for moderate and heavy activity increase the number of portions in the user's Portions Profile to account for higher activity.

In one embodiment, in step (c), the daily recommended amount of carbohydrates comprises a first subcategory including grain/legume, starchy vegetable, leafy vegetable, crunchy vegetable, fruit, and extra carbohydrates. In yet another embodiment, in step (c), the daily recommended amount of fat comprises a second subcategory including saturated, monounsaturated, omega-3, and omega-6.

In one embodiment, in step (h), building metabolic factor comprises 32.5% carbohydrates, 42.5% fat, and 25% protein. In another embodiment, in step (b), extra building metabolic factor comprises 30% carbohydrates, 45% fat, and 25% protein. In another embodiment, in step (b), balancing metabolic factor comprises 40% carbohydrates, 40% fat; and 20% protein.

In another aspect of the invention, a system is provided; comprising: an Internet-connected computerized appliance having a processor and coupled to a data repository, the processor executing software from a non-transitory medium, the software providing an interactive interface to a Portions Profile system, the system enabling a user to: log on and complete registration; answer a Portions Profile questionnaire to generate a customized Portions Profile comprising a daily recommended amount of protein, carbohydrates, fats, fluids, and cultured food and/or beverage to promote metabolic healing; enter and monitor food intake; compare the food intake to the customized Portions Profile; and make real-time adjustments to what the user eats based on the portions consumed and remaining during the course of a day in order to consume appropriate portions of each macronutrient category and subcategories.

BRIEF DESCRIPTION OF THE SEVERAL VIEWS OF OTHER DRAWINGS

It is to be understood that the other drawings shown outside the body of this document are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. Referring to the drawings in which like reference character (s) present corresponding part(s) throughout:

Figure 3:
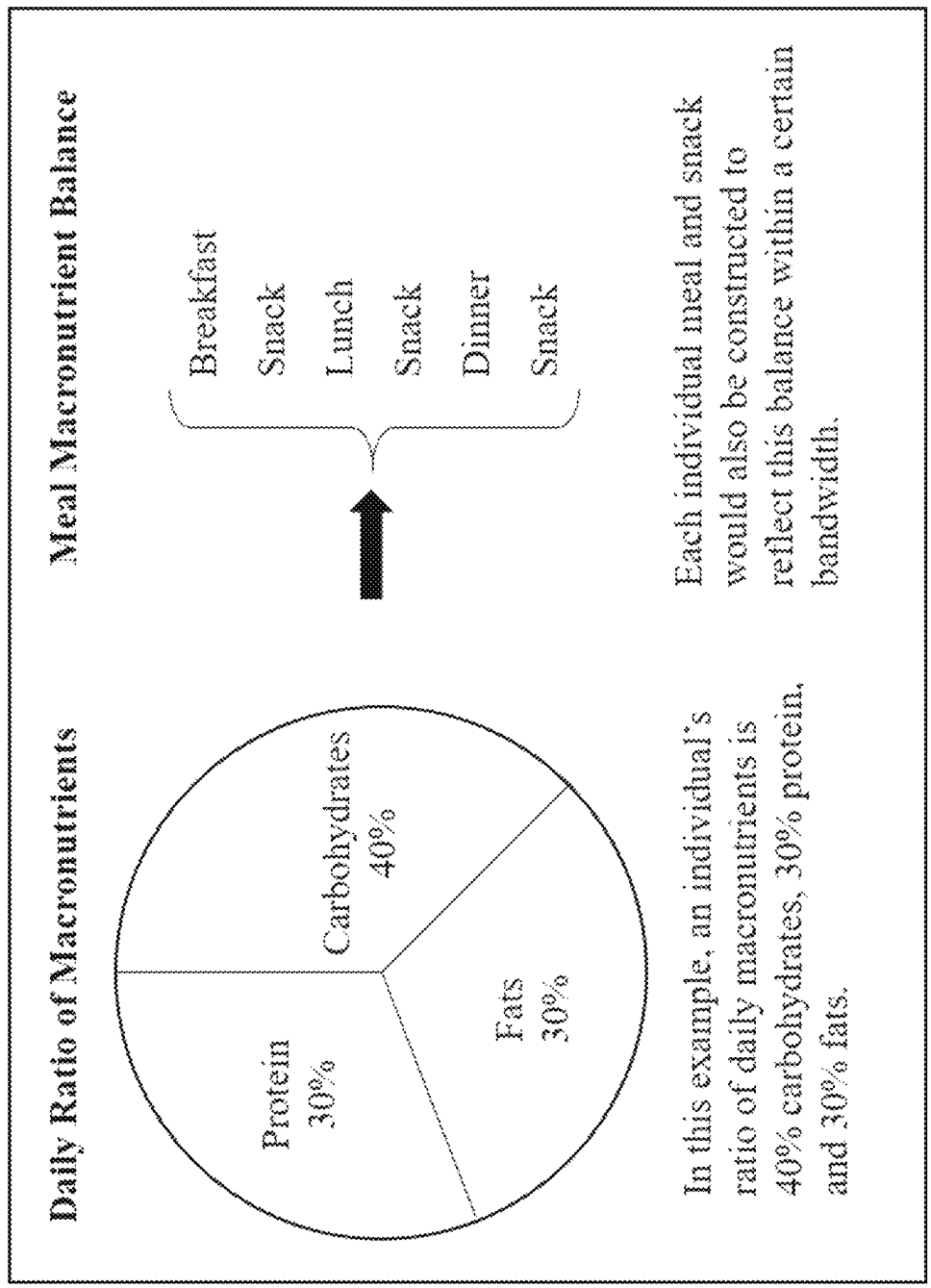
Figure 4:
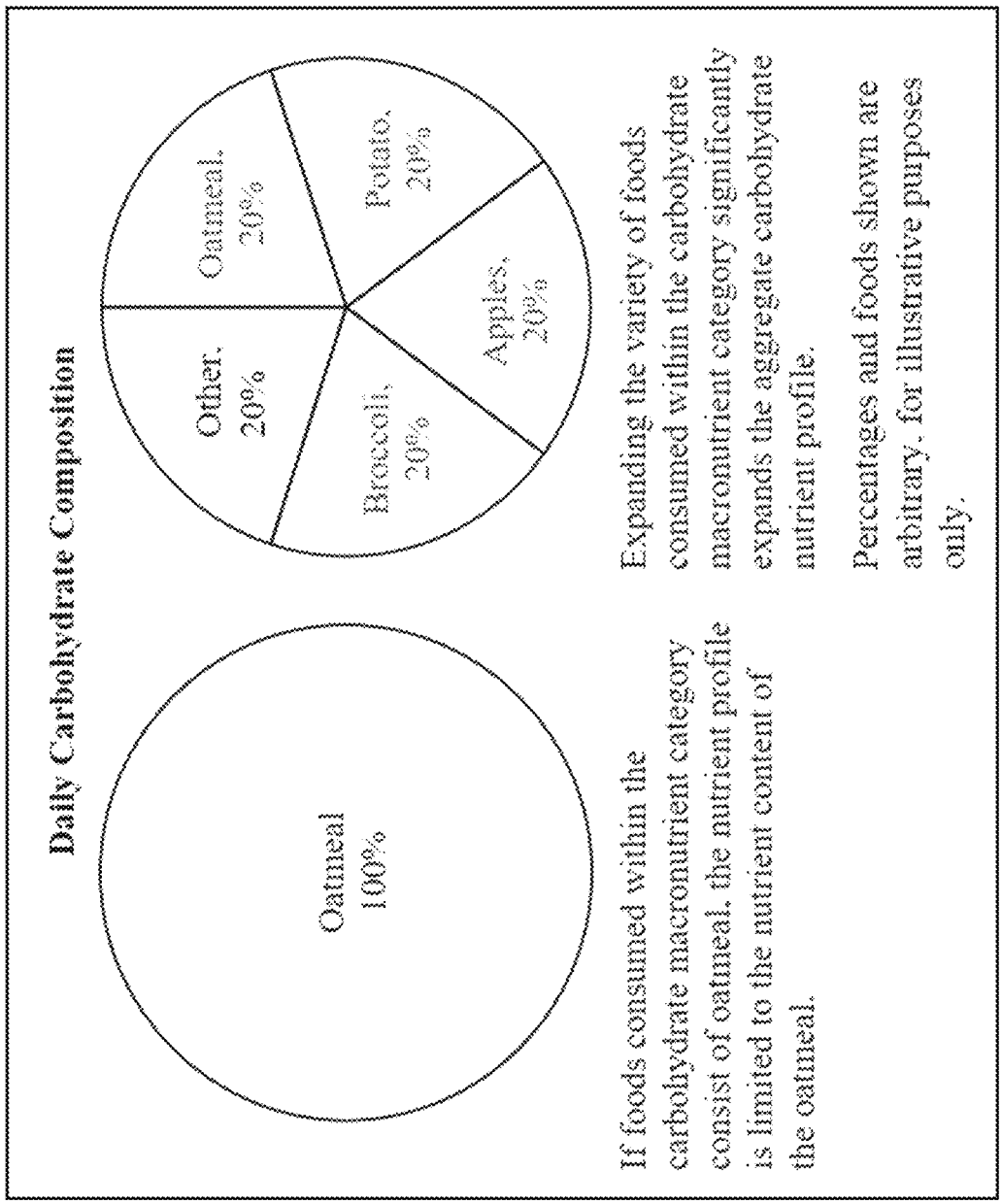

FIG. 3 provides an example of the relationship between overall dietary balance and balance in individual meals and snacks FIG. 4 provides a visual schematic showing how the aggregate nutrient profile of a varied selection of foods vastly exceeds the nutrient profile of just one food.

Figure 5:
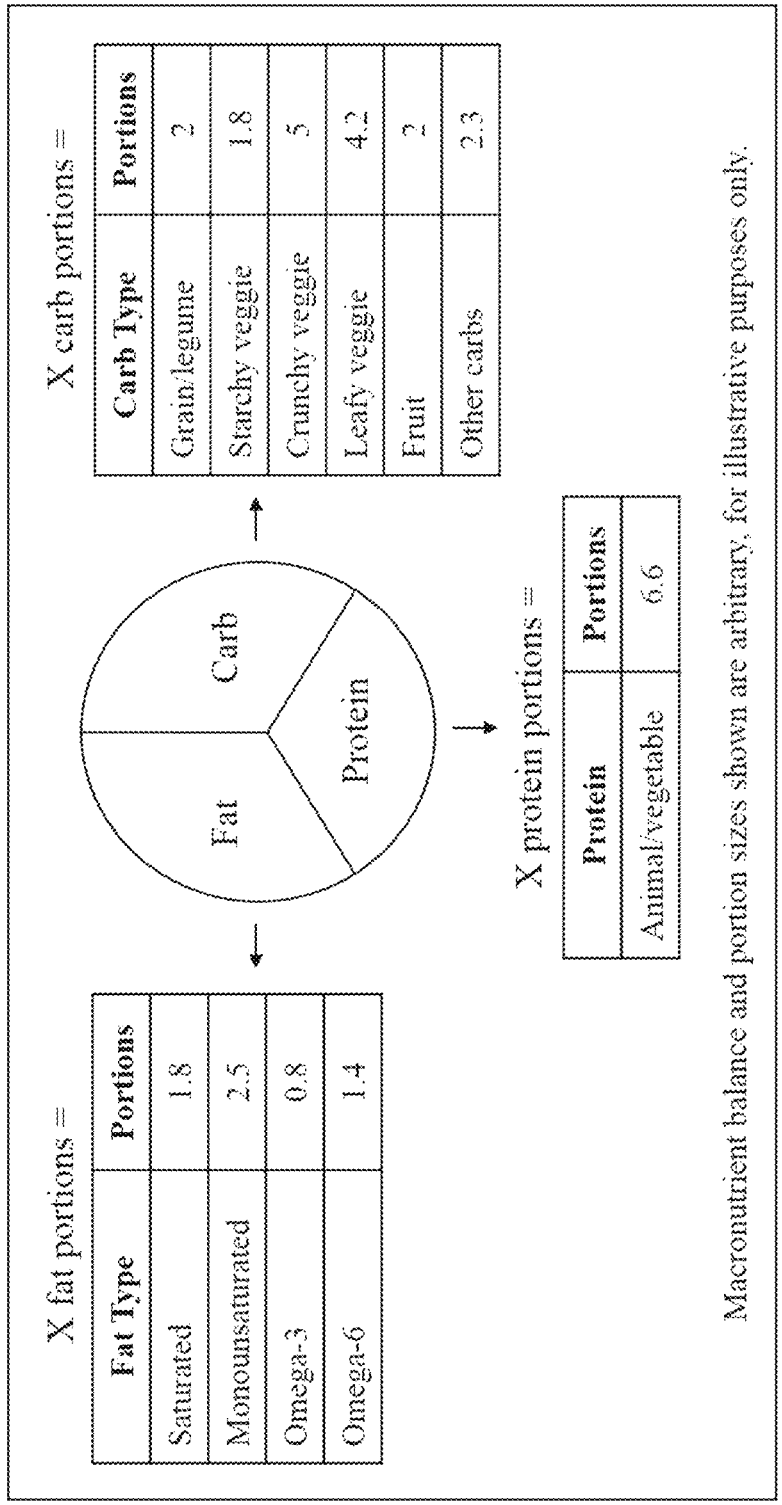

FIG. 5 shows a user's portions profile comprises x-number of portions of each macronutrient subcategory according to an embodiment of the present invention.

Figure 6:
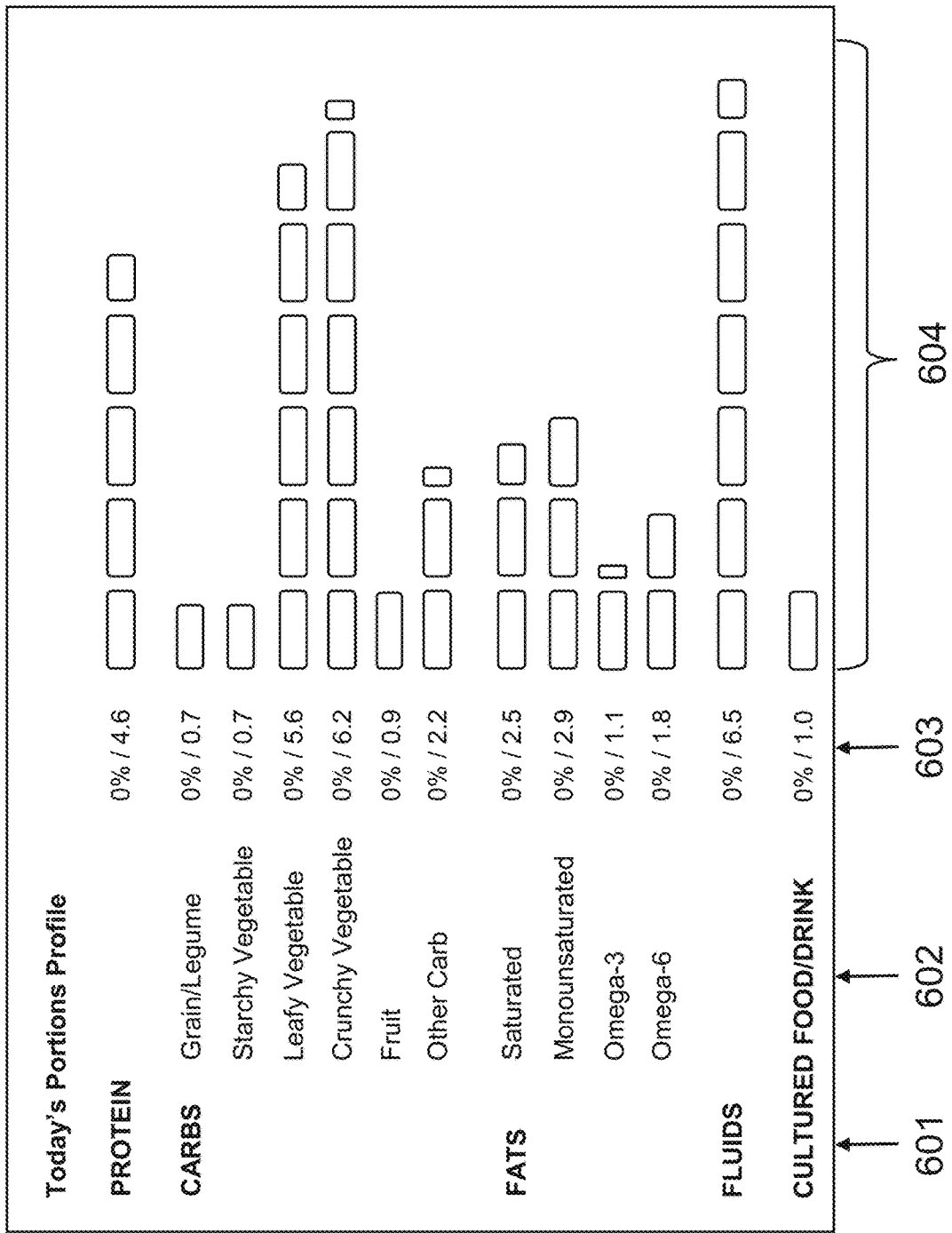

FIG. 6 is an example of a Portions Profile according to n embodiment of the present invention.

Figure 7:
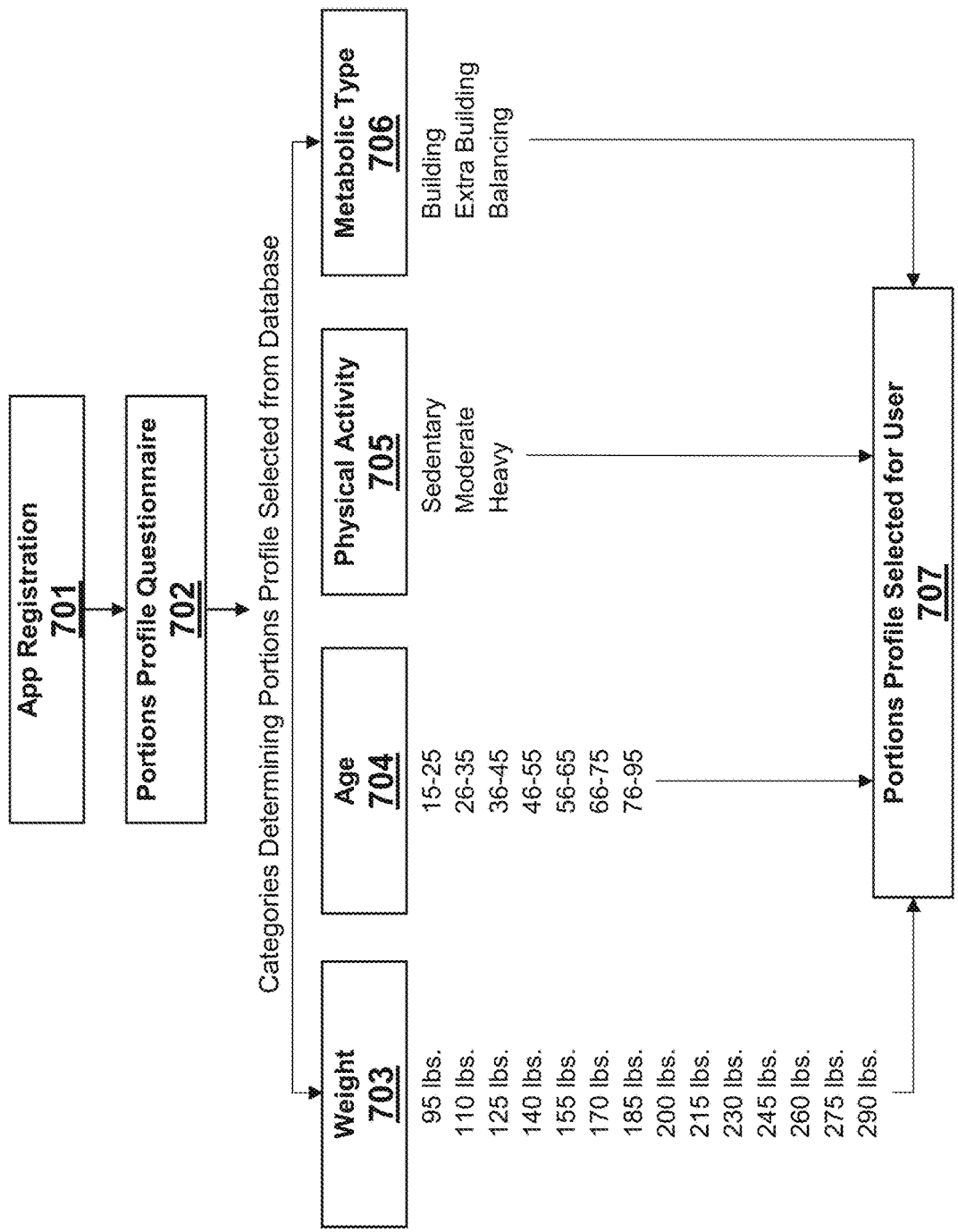

FIG. 7 is a flow diagram illustrating how the number of portions in each Portions Profile is selected according to an embodiment of the present invention.

Figure 8:
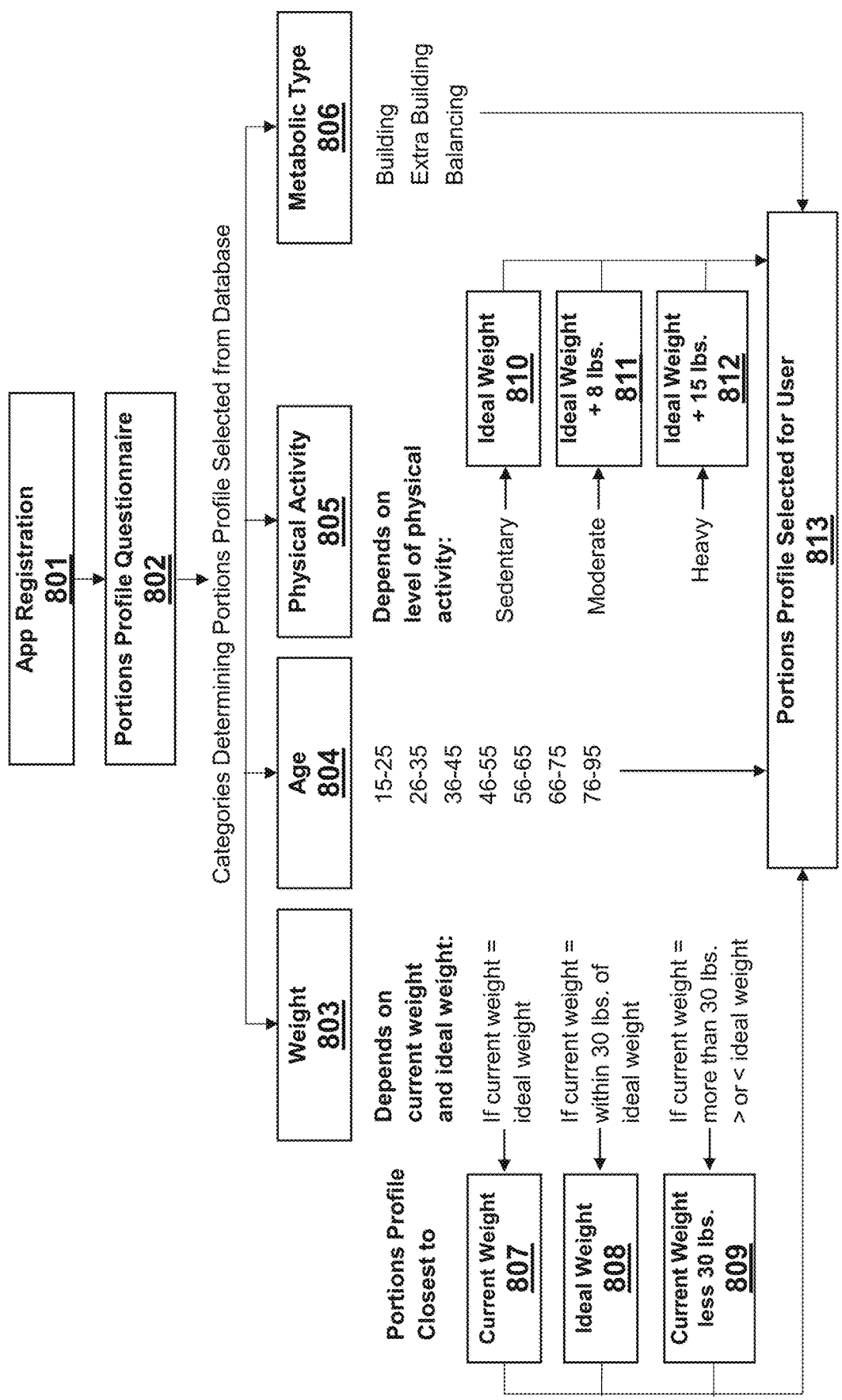

FIG. 8 is a flow diagram illustrating how the number of portions in each Portions Profile is calculated according to an embodiment of the present invention.

Figure 9A:
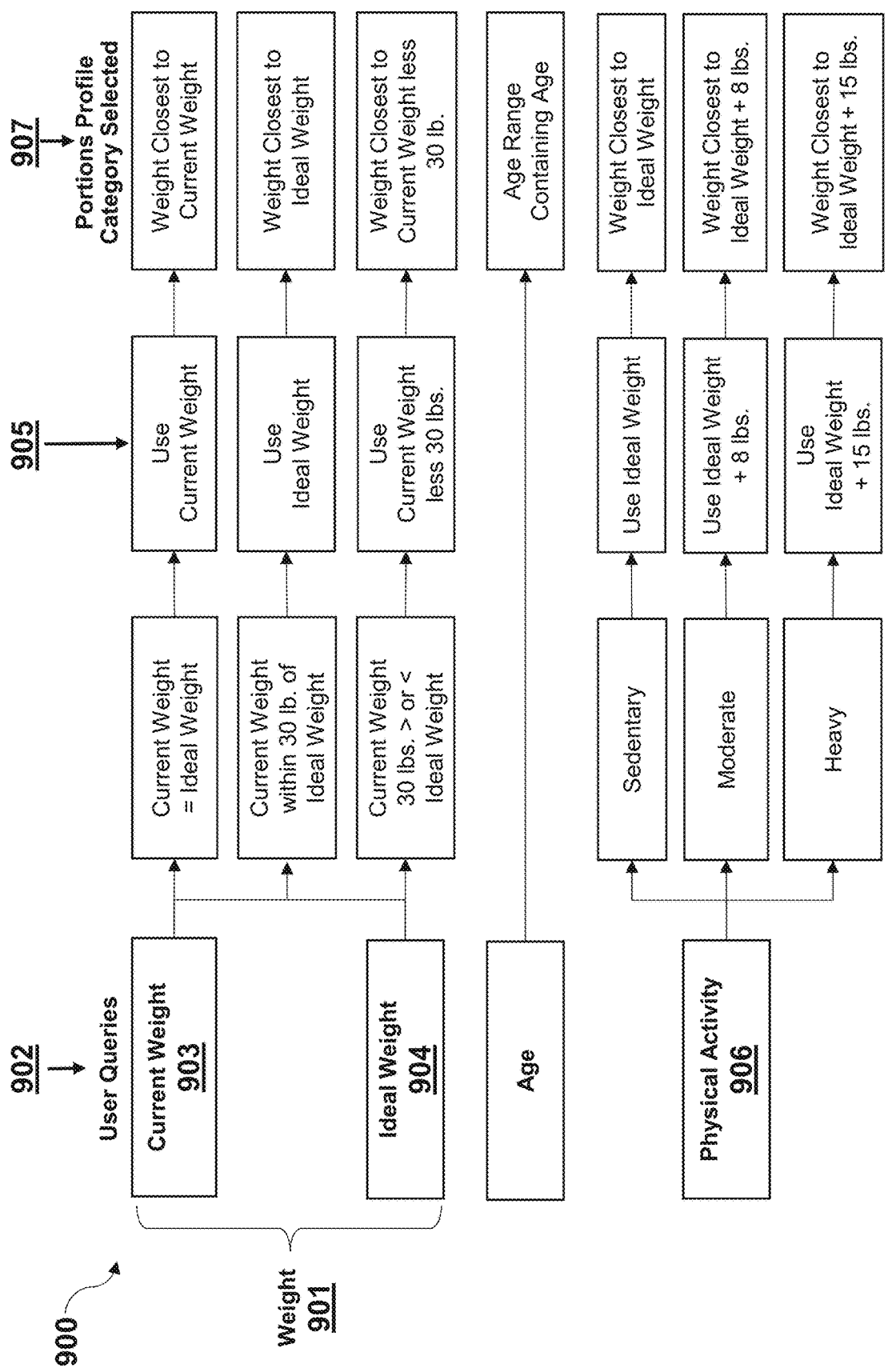
Figure 9B:
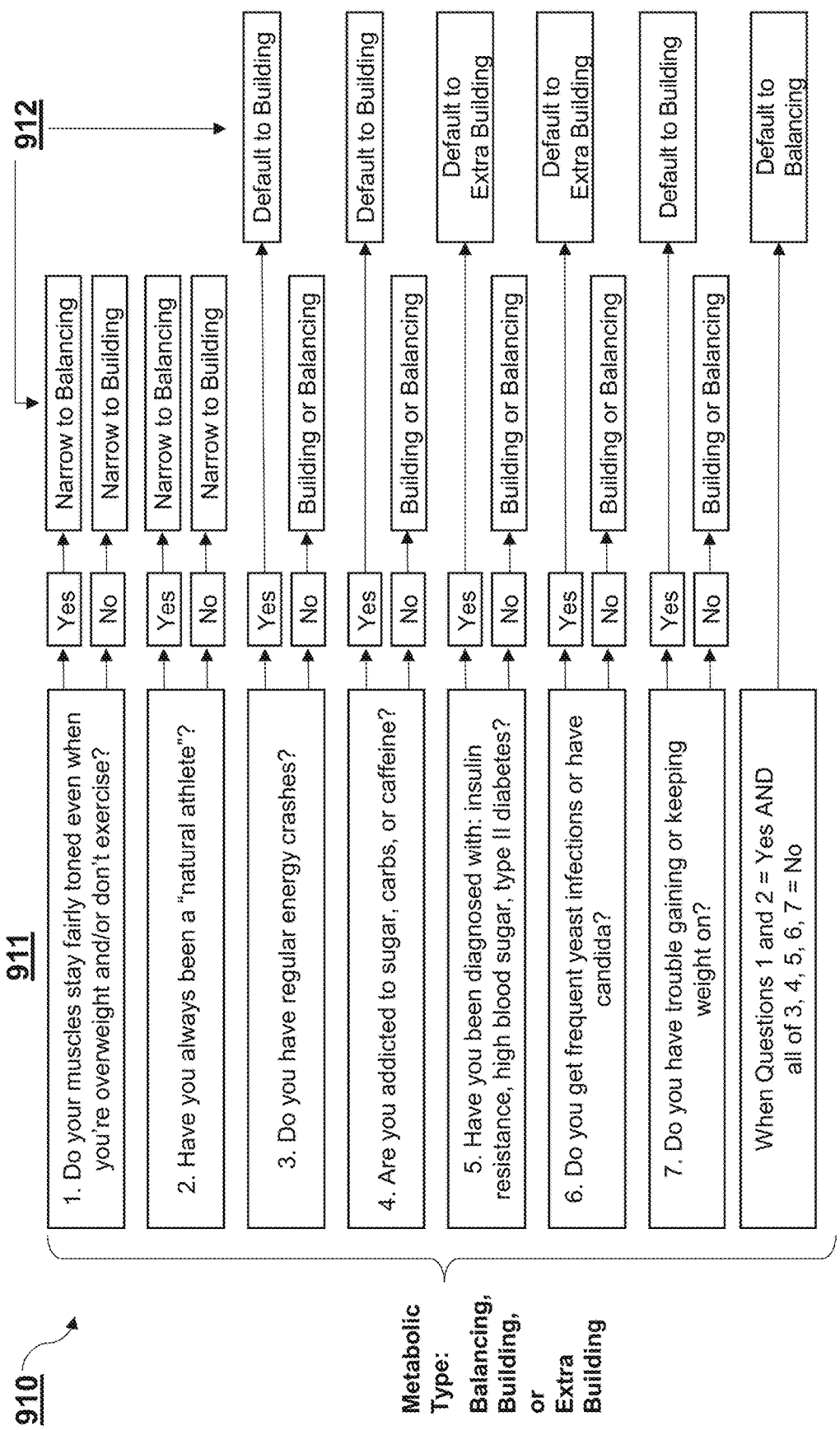

FIGS. 9A-B are flow diagrams illustrating the factors that influence the selection of a Portions Profile for an individual user according to an embodiment of the present invention.

Figure 10A:
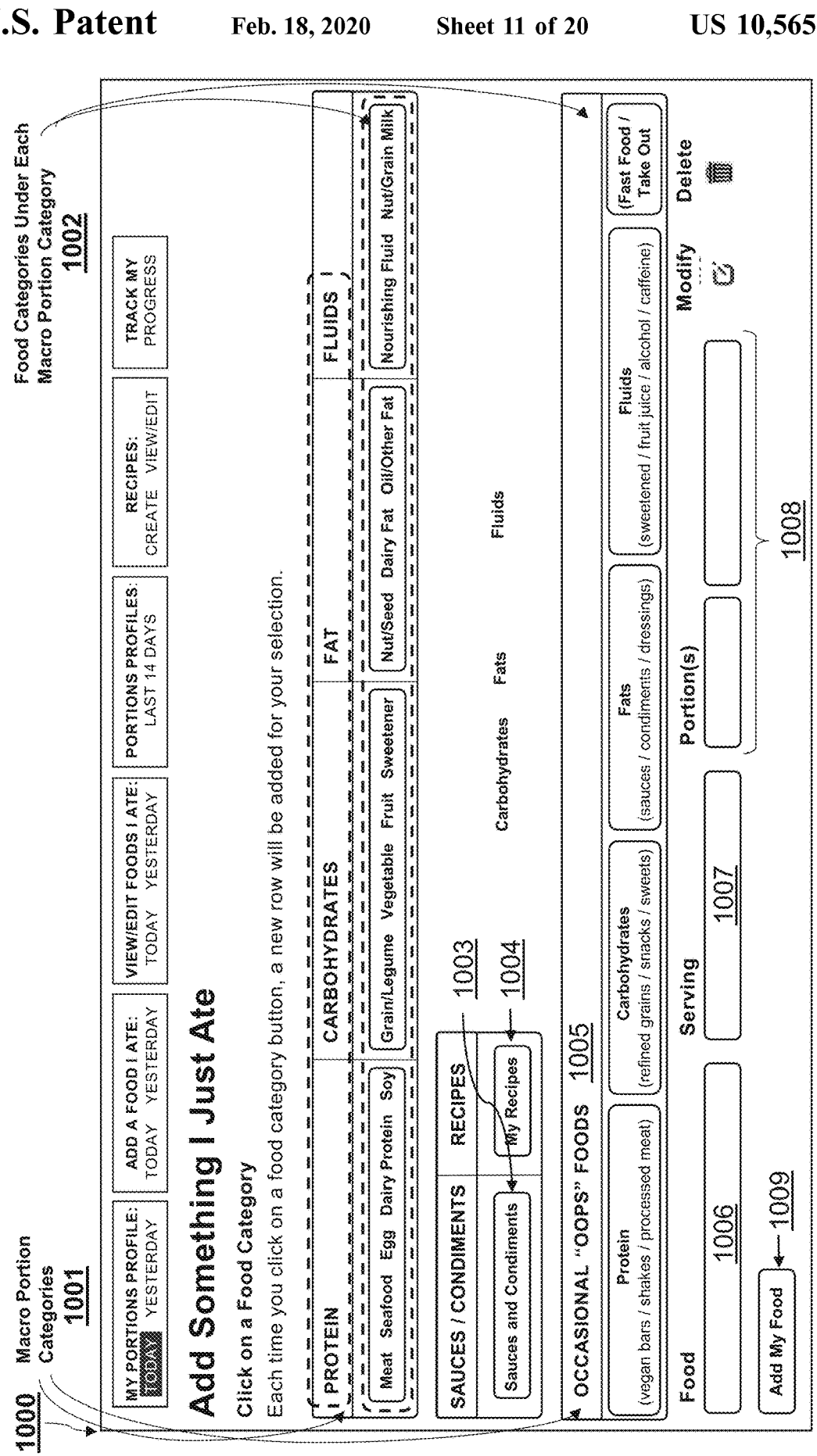
Figure 10C:
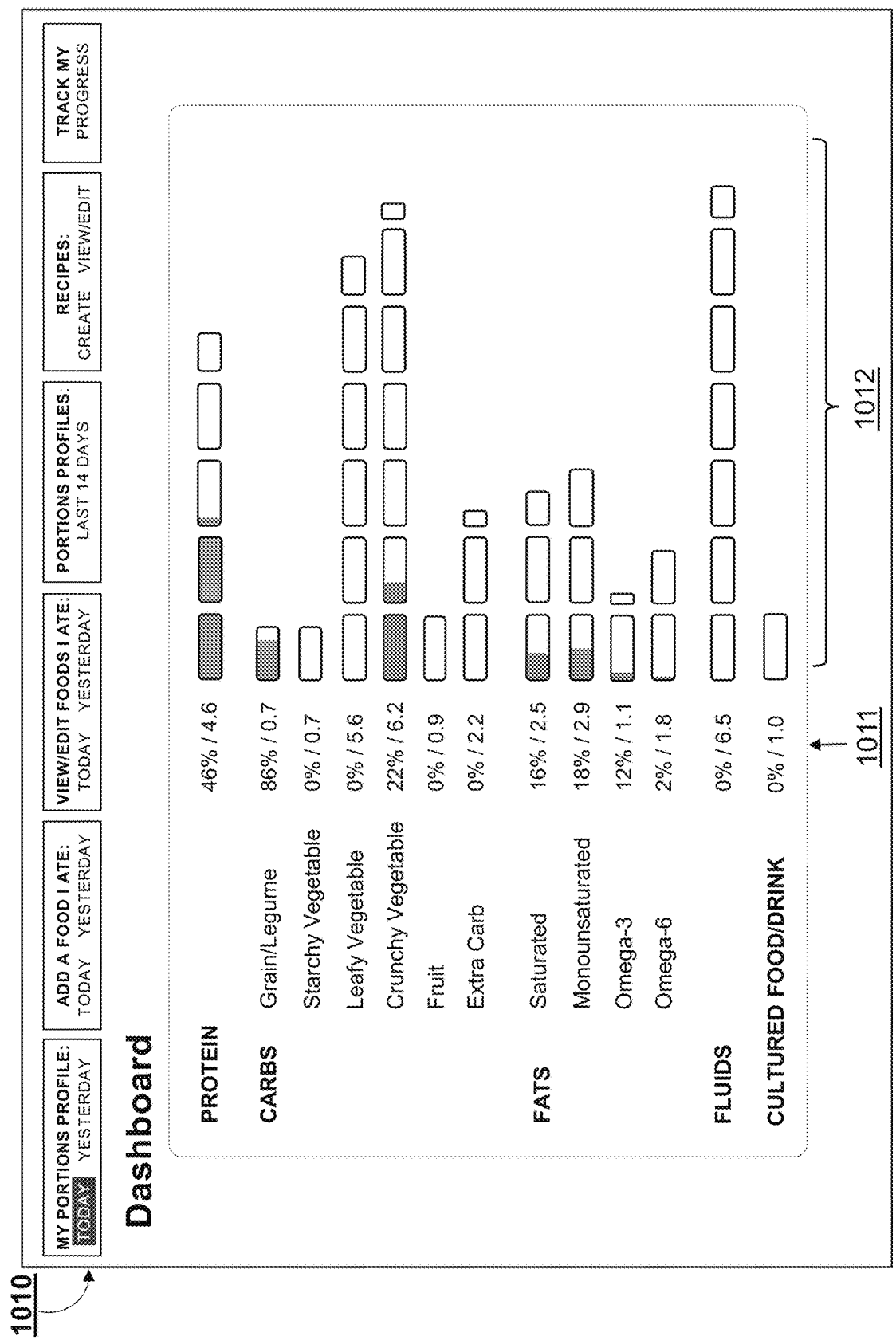

FIGS. 10A-C illustrate the structure of the Portions System web application interface that enables a user to enter healthy foods eaten that will be converted to portions and added to the user's Portions Profile according to an embodiment of the present invention.

Figure 11A:
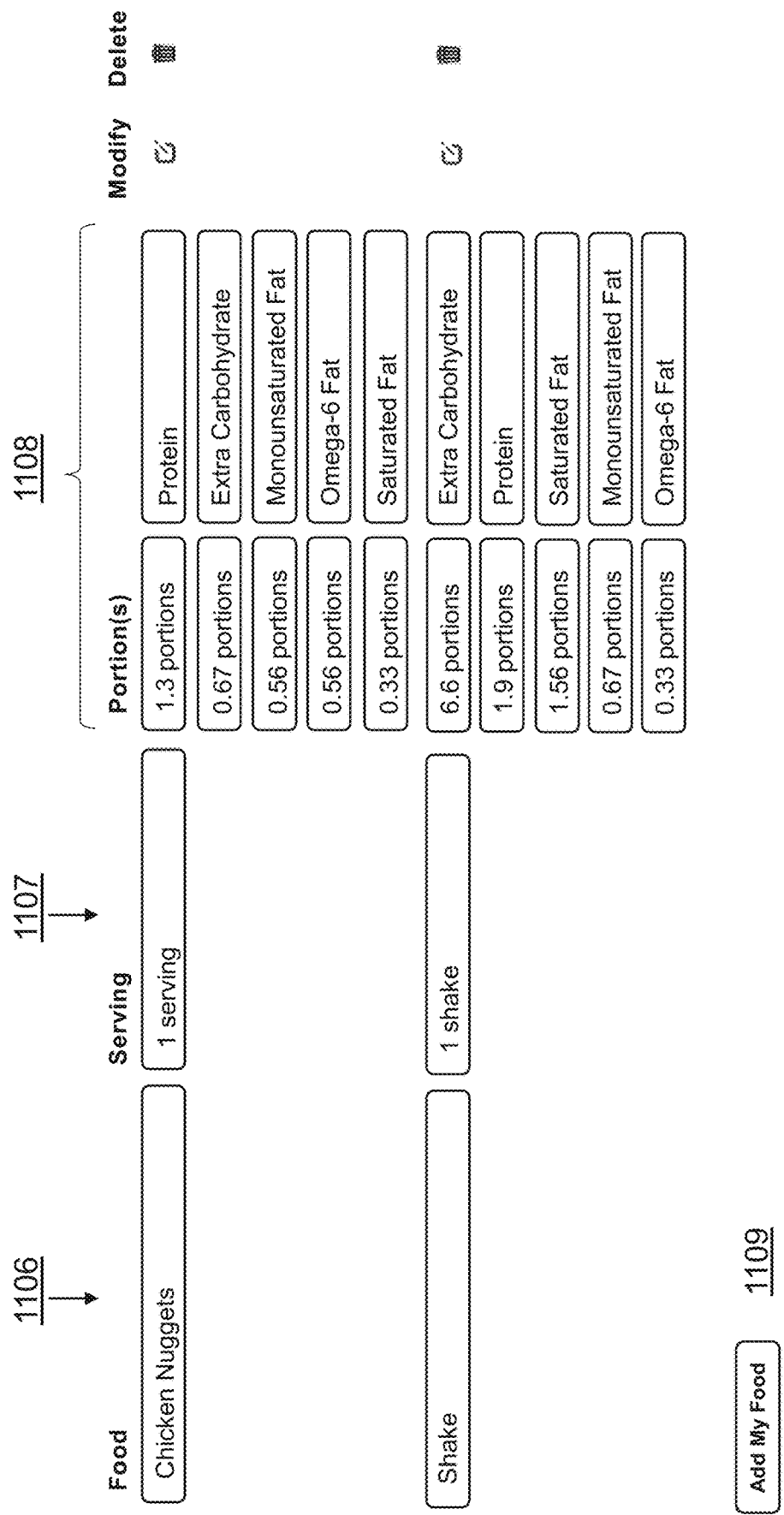
Figure 11B:
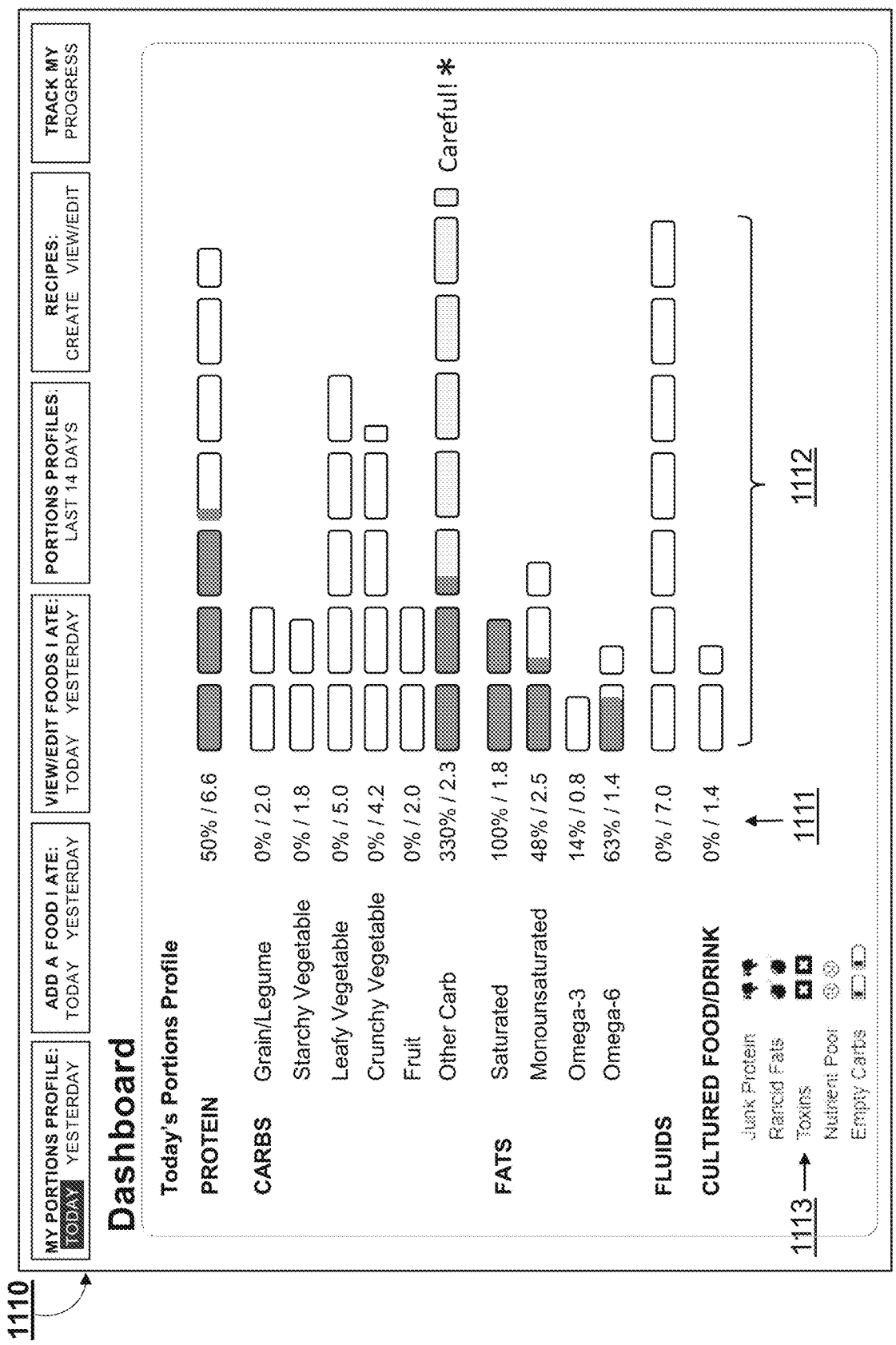

FIGS. 11A-B illustrate the entering of unhealthy foods eaten that will be converted to portions and added to the user's Portions Profile according to an embodiment of the present invention.

Figure 12C:
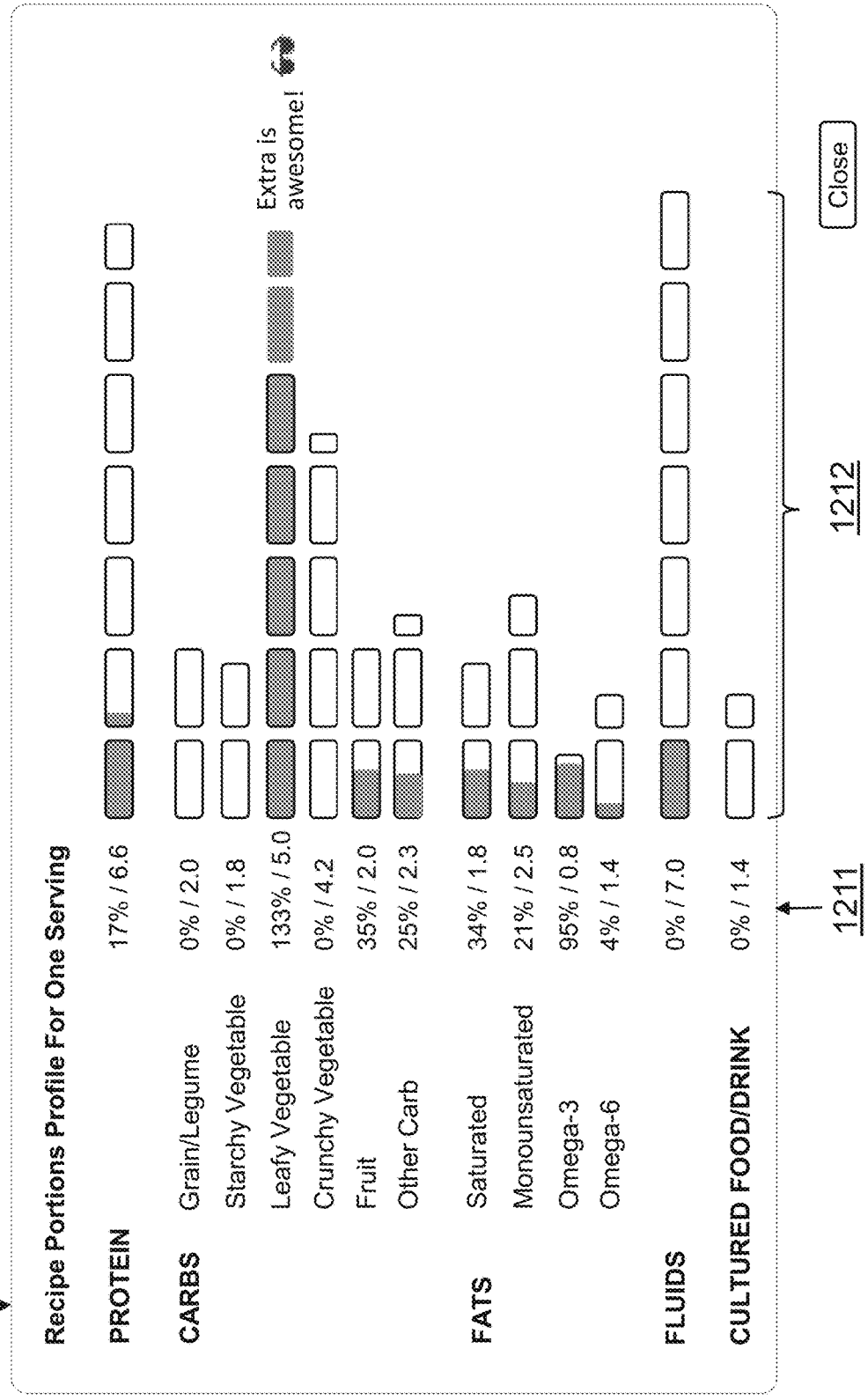

FIGS. 12A-C illustrate the structure of the Portions System web application interface that enables a user to create recipes for commonly eaten meals and snacks by entering the ingredients and previewing the recipe in the user's Portions Profile to assess appropriate balance and variety. After a recipe has been created, the user may add the recipe for the meal or snack in the Add A Food I Ate page when it is eaten rather than enter the individual ingredients separately.

FIG. 13 is a diagram explaining that Food Categories may affect more than one Portion Category and illustrating which Portion Categories are affected by foods in each Food Category. For example, when a nut is eaten, the portions for protein, other carb, and one or more of the fat categories will be filled in on the user's Portions Profile.

Figure 14:
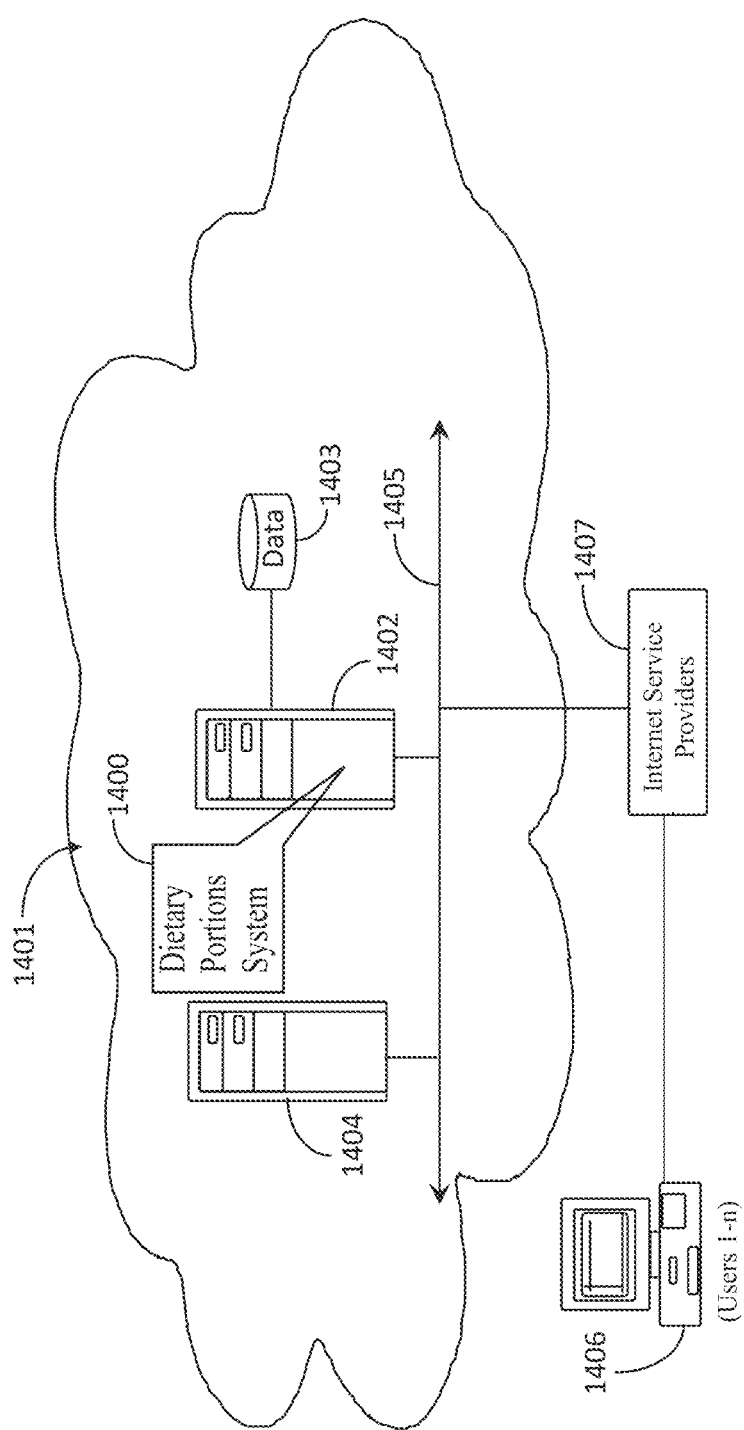

FIG. 14 is an architectural diagram of an Internet computer network system according to an embodiment of the present invention.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Metabolic damage is a very confusing, and indeed, largely unknown, disease with many symptoms that appear to be completely unrelated to each other. Further, symptoms may not be the same for every person who has metabolic damage. For example, one person may suffer from obesity, high cholesterol, high blood pressure, and low energy; whereas another may have severe acne, chronic acid reflux, and be underweight; and still another person may have insulin resistance, chronic pain unrelated to an injury, and osteoporosis. Table 1 below includes a partial list of health conditions that are commonly thought to be standalone conditions but are actually inter-related symptoms of metabolic damage (adapted from Schwarzbein pg. 5-6, 9, 16).

TABLE 1

Figure 1:
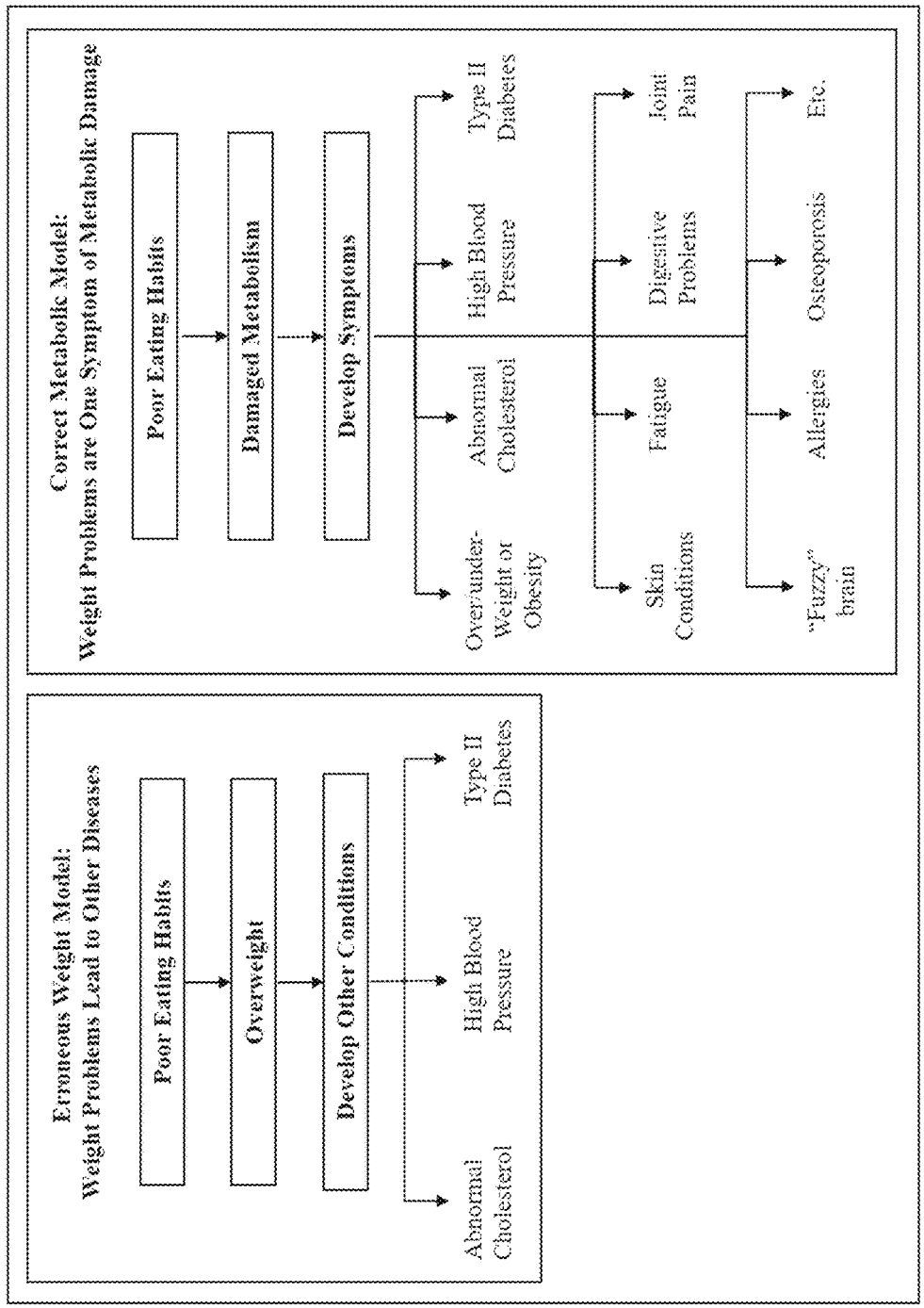
FIG. 1 illustrates the difference in weight-loss versus metabolic healing models.

Poor energy and stamina
Poor memory and concentration
Mood problems
Poor sleep
Poor digestion and bowel function
General physical weakness
Weak bones, teeth, hair, and nails
Addictions: sugar, artificial sweeteners, caffeine, nicotine, alcohol, and/or drugs
Allergies
Asthma
Chronic pain unrelated to injury
Frequent headaches
Chronic heartburn
Frequent infections
Over/underweight
Skin problems
Degenerative diseases of aging:

Abnormal cholesterol
Cancer (particularly breast, prostate, and colon)
Dementia
Depression (long term)
Early menopause
Heart disease
Insulin resistance
Obesity
Osteoarthritis
Osteoporosis
Stroke
Type II diabetes Many individuals suffering from metabolic damage mistake a symptom for the problem itself. For example, a common misunderstanding is that not only is obesity a standalone health condition unrelated to metabolic health, it is also the cause of other health problems such as abnormal cholesterol, high blood pressure, insulin resistance, and increased risk for heart disease. This confusion leads millions of people to use various "one size fits all" diets and, increasingly, diet apps that compute a certain number of daily calories and provide an interface for logging foods eaten and tracking calories consumed, in the hope that they will not only lose weight, but, in the process, eliminate the other problems they believe are caused by their obesity. In reality, obesity, abnormal cholesterol, and high blood pressure are all symptoms of metabolic disease (Schwarzbein pg. 96-97). While trying to "cure" a symptom of any problem may result in temporary abatement of the symptom, it will neither cure the problem nor eliminate the symptom. FIG. 1 illustrates the difference in these healing models (Schwarzbein pg. 1-16).

Figure 2:
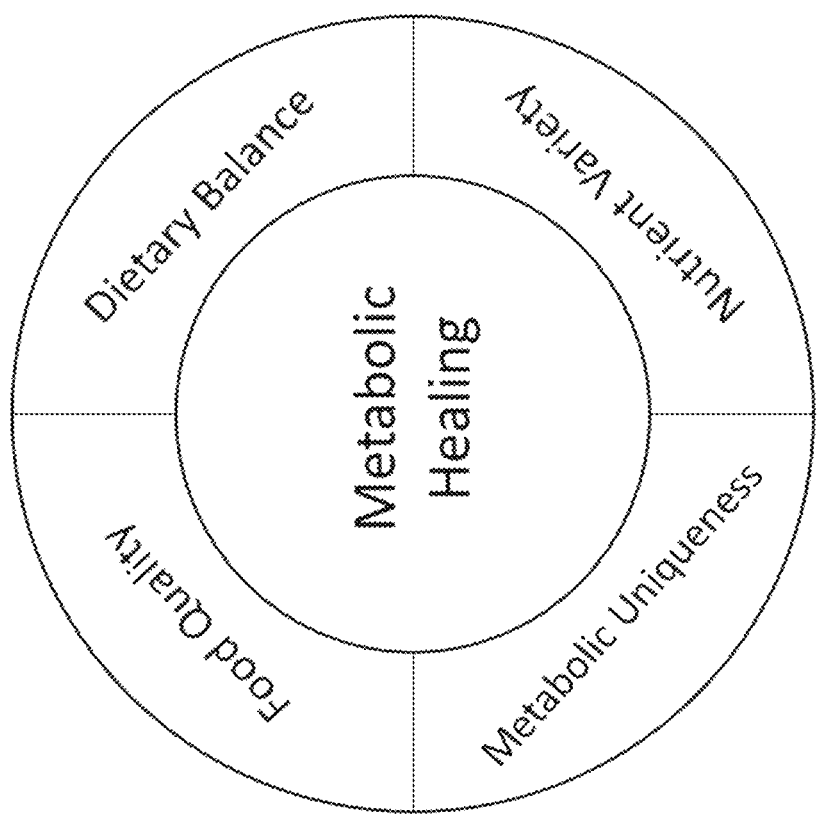
FIG. 2 illustrates a comprehensive nutritional plan that takes into consideration food quality, dietary balance, variety, and metabolic uniqueness as necessary to heal at the metabolic level.

Because obesity is a symptom of metabolic damage, the solution to losing weight is through metabolic healing and not through dieting or counting calories. As Dr. Schwarzbein affirms: "Eating too many calories is not the reason people become fat, and counting calories will never make a person thin." (Schwarzbein pg. 16). Because one's diet is a major contributing factor to metabolic damage, dietary changes can facilitate the healing of metabolic damage. A comprehensive nutritional plan that takes into consideration food quality, dietary balance, variety, and metabolic uniqueness is necessary to heal at the metabolic level, as shown in FIG. 2. The reason all four components are necessary for metabolic healing is explained in the following paragraphs.

Eating quality food is essential for metabolic healing. A preponderance of food sold in the United States is poor-quality, highly refined, and contains health-diminishing ingredients from numerous sources, including 1) more than three thousand additives that include preservatives, sweeteners, colors, flavors and spices, flavor enhancers, fat replacers, synthetic vitamins, emulsifiers, stabilizers and thickeners, pH control agents and acidulants, leavening agents, humectants, yeast nutrients dough strengtheners and conditioners, firming agents, enzyme preparations, and gasses; 2) pesticides (in crop and animal foods); 3) genetically modified foods; 4) antibiotics (in animal products); 5) hydrogenated fats; and 6) refined grains. Many of these ingredients are highly regulated because of health and safety concerns. For example, pesticides and FDA-approved food additives are required to have material safety data sheets ("MSDSs") showing toxicity data, meaning these ingredients have the potential to harm. Table 2 provides excerpts from some MSDSs for common preservatives used in refined foods warning of the harm caused through ingestion (sources: material safety data sheets: Ammonium Sulfate, Butylated Hydroxy-anisole (BHA), Butylated Hydroxy-toluene (BHT) Potassium Bromate, Sodium Nitrite, Sodium Nitrate).

TABLE 2

| Preservative | Common Uses | Partial MSDS Warning |
| --- | --- | --- |
| Ammonium sulfate | Bread, fertilizer, printed circuit boards, flame retardant | Harmful if swallowed. Risk of serious damage to eyes. Irritating to respiratory system and skin. Harmful to aquatic organisms |

TABLE 2-continued

| Preservative | Common Uses | Partial MSDS Warning |
| --- | --- | --- |
| Butylated hydroxy-anisole (BHA) | Prevent rancidity in foods | Possible cancer hazard. May cause cancer based on animal data. Risk of cancer depends on duration and level of exposure. Harmful if swallowed. Irritant. Causes eye, skin, and respiratory tract irritation. May cause allergic skin reaction. May be harmful if swallowed. |
| Butylated hydroxy-toluene (BHT) | Prevent rancidity in numerous foods; cosmetics; jet fuel; rubber; embalming fluid | Harmful if swallowed. Limited evidence of a carcinogenic effect. Possible risk of harm to the unborn child. Possible risk of irreversible effects. Irritating to eyes, respiratory system and skin. Very toxic to aquatic organisms, may cause long-term adverse effects in the aquatic environment. |
| Potassium bromate | Bread products | Very hazardous in case of eye contact . . . Hazardous in case of skin contact (irritant), of ingestion, of inhalation. Slightly hazardous in case of skin contact (permeator). Prolonged exposure may result in skin burns and ulcerations. Over-exposure by inhalation may cause respiratory irritation. Inflammation of the eye is characterized by redness, watering, and itching. |
| Sodium nitrite | Preserve meat products; metal coatings; chemical reacting agents for photography; textile dyes | Very hazardous in case of eye contact . . . of ingestion, of inhalation. Hazardous in case of skin contact . . . Slightly hazardous in case of skin contact (permeator). Prolonged exposure may result in skin burns and ulcerations. Over-exposure by inhalation may cause respiratory irritation. Severe over-exposure can result in death. Inflammation of the eye characterized by redness, watering, and itching. |
| Sodium nitrate | | Hazardous in case of ingestion. Slightly hazardous in case of skin contact (irritant), of eye contact (irritant), of inhalation. Prolonged exposure may result in skin burns and ulcerations. Over-exposure by inhalation may cause respiratory irritation. The substance may be toxic to blood. Repeated or prolonged exposure to the substance can produce target organs damage. |

In addition, the Environmental Protection Agency ("EPA") reports that "pesticides are widely used in producing food . . . [and] may remain in small amounts (called residues) in or on fruits, vegetables, and other foods" (U.S. Environmental Protection Agency, *Setting Tolerances on Pesticide Residues in Foods*). The California Department of Pesticide Regulation states that "pesticides can make you sick" and enforces strict rules to protect farm workers from "pesticide dangers at work." These rules include limits on time spent in a sprayed field and how long a worker must wait until after a crop field is sprayed before entering the field, as well as lists symptoms of pesticide poisoning, which include headache, dizziness, upset stomach, blurred vision, flu-like symptoms, a rash, or eye pain, and steps for protecting oneself when working in a pesticide-sprayed field (*Pesticide Safety Rules for Farmworkers.* September 2004). The U.S. Centers for Disease Control ("CDC") reports that the main source of exposure to at least one class of pesticides is fatty foods such as milk, dairy products, and fish. The CDC adds that these pesticides can be transmitted to infants through breast milk and to fetuses in uterine (Centers for Disease Control. Biomonitoring Summary. *Organochlorine Pesticides Overview*).

In addition, genetically modified ("GMO") foods are now ubiquitous in non-organic foods, particularly genetically modified soy, corn, canola oil, and cottonseed oil. The American Academy of Environmental Medicine ("AAEM") reports that animal studies have linked genetically modified foods to infertility, immune dysregulation, accelerated aging, dysregulation of genes associated with cholesterol synthesis, insulin regulation, cell signaling, protein formation, and changes in the liver, kidney, spleen, and gastrointestinal system (AAEM, *Genetically Modified Foods*).

In addition, 80 percent of all antibiotics sold in the U.S. are administered to farm animals (Brady, Dennis. "FDA allows antibiotics in animal feed despite potential risk to human health, report claims." *The Washington Post*. Jan. 27, 2014). The CDC has reported that resistant bacteria can contaminate animal products, and that people who eat these foods can then develop antibiotic-resistant infections. According to the CDC, antibiotic-resistant infections from food make at least 2 million Americans sick every year and kill about 23,000, in addition to killing even more people who die from other conditions that were complicated by an antibiotic-resistant infection (Centers for Disease Control, *Antibiotic Resistance Threats in the United States,* 2013).

Hydrogenated and partially hydrogenated fats, also known as trans fats, have been definitively linked to heart disease (National Academy of Sciences, *NAS Panel: Only Safe Intake of Trans Fat is Zero*. Jul. 10, 2002). Despite this finding and the FDA's acknowledgement of its validity (FDA, Trans Fat), hydrogenated fats are commonly used in refined foods, including but not limited to baked goods, fried foods; dough products, shortening, margarine, and coffee creamers.

Refined grains are grains that have been stripped of their nutrients and fiber. A whole grain has three components: the germ, which is rich in antioxidants, vitamin E, and B vitamins; the bran, which contains fiber, B vitamins, and minerals; and the endosperm, which is the starchy part of the grain that contains no nutrients. Refined grains have been stripped of the germ and bran, leaving only the endosperm, which, because it is pure starch, is treated by the body like sugar. That is, refined grains are immediately converted to glucose, contributing to excess fat and inflammation, i.e., metabolic damage.

Eating a diet of organic, nutrient-dense whole foods, including whole grains, unrefined oils, and pastured meat and dairy foods; is the most basic means of eliminating stored toxins and providing the vitamins, minerals, phyto-nutrients, and fiber necessary for metabolic healing. Most individuals who choose to use a food-monitoring system to improve their health do not know the difference between healthy foods and unhealthy foods. It is therefore critical that a food-monitoring system designed for metabolic healing teach the user the difference between healthy and unhealthy food.

For a food app to be useful, the user must enter all foods eaten. Many food logging and calorie counting apps provide a large database containing thousands and even millions of foods, a large portion of which are packaged refined foods, with no differentiation between them and healthy selections, implying to the user that these refined foods are healthy. Because these foods do not contain the nutrients needed for healing and also contain additives known to be toxic to the body, an app or resource enabling and even encouraging a user to eat such foods cannot facilitate metabolic healing through its use and; indeed, may exacerbate any health condition the user seeks to heal. For example, Indiana. University Health's list of "Low Carbohydrate Foods" contains a list of foods categorized by type of food, such as "bread," "fruit," "cereals and grains," "unlimited use,' etc. Included in the "unlimited use" category are diet soft drinks; sugar-free drink mixes, and sugar-free Jell-O, all of which contain aspartame and other artificial sweeteners as well as artificial colors known to have deleterious effects on health. Also included under unlimited use are fat-free salad dressing and regular or light "whipped topping," which often contain hydrogenated fats. In addition, the "other carbohydrates" category includes cake, cupcakes, brownies, sweet roll, Rice Krispy treats, Vanilla wafers, toaster pastry, cookies, and glazed doughnuts, all of which contain refined grains, high sugar, artificial additives, and no nutrients. Also included in this category are chicken nuggets, which often contain artificial additives and hydrogenated fats. The list makes no differentiation between healthy and unhealthy foods, leading the user to believe that all foods listed are health promoting. In addition, there is no guidance on how to eat these foods in the context of a balanced meal.

While the inclusion of unhealthy selections in a food database is important because users who have been eating a poor-quality diet for years will realistically take some period of time to fully transition to a healthy diet, it is critical to differentiate between which selections are healthy and which are not so the user learns not only the difference, but the impact of poor-quality food to his or her health. In this way, the user learns to make healthy selections.

For example, as discussed, the system described herein separates all unhealthy foods into four distinct subcategories in an overarching category of unhealthy foods called "Occasional Oops Foods." Further, when an Oops Food is entered and added to the user's Portions Profile, a list of reasons that the food is unhealthy appears, including "junk protein," "rancid fats," "toxins," "nutrient poor," and "empty carbs." Thus, while transitioning to a healthy diet, the user is able to enter unhealthy foods eaten and clearly see the impact of those foods on his or her health. In addition, the system's companion "Eat2Heal" video training series teaches the user quality food standards and how to evaluate foods to determine whether they are quality selections to augment learning while transitioning to a healthy diet.

Dietary Balance. Eating quality food is necessary but not sufficient to trigger metabolic healing. That is, even if an individual's diet consists of 100% healthy food, the individual could still have some degree of metabolic damage if the food is not eaten in a balanced way. The balance of carbohydrates, protein, and fats in meals consumed also affects metabolic healing. That is, while every individual consumes some ratio of carbohydrate, protein, and fat foods during the day, the critical factor is consuming a particular balance of carbohydrates, proteins, and fats in each meal and snack to effect metabolic healing.

Experts have found that eating meals composed of foods containing all three macronutrient groups enables the body to enter an efficient metabolic state. For example, endocrinologist Diana Schwarzbein, M.D., advises patients to eat meals consisting of 1) a protein, 2) some fat, 3) a "real" carbohydrate (that is, a plant food with relatively high carbohydrates per unit to provide fuel for the body, such as fruit, whole grains, legumes, or a starchy vegetable), and 4) a nonstarchy vegetable (that is, a plant food with relatively low levels of carbohydrates per unit, such as spinach, bell peppers, or asparagus) that primarily delivers nutrients such as vitamins, minerals, phytonutrients, and fiber to the body (Schwarzbein pg. 228-229). Biochemist and expert in dietary control of hormonal and inflammatory responses Barry Sears, Ph.D., asserts the need to "eat food in a controlled fashion and in the proper proportions" (Sears, Ph.D., Barry. The Zone. Harper-Collins Publishers Inc., New York, N.Y. 1995. (hereafter, "Sears") pg. 3), specifying a ratio of 40% carbohydrates, 30% protein and fats as the macronutrient ratio to achieve metabolic optimization and efficiency (Sears pg. 71). FIG. 3 provides an example of the relationship between overall dietary balance and balance in individual meals and snacks. As shown, each meal and snack should contain the three macronutrients, and in a combination that closely conforms to an individual's ratio of daily macronutrients.

While, in addition to tracking calories, some food-tracking and calorie-counting systems log the number of carbohydrate, protein, and fat grams in the foods the user enters, they do not provide a specific ratio of carbohydrate, protein, and fat grams to eat based on a user's unique metabolic needs, or provide a user interface that shows a clear graphical utilization of macronutrients consumed in the context of a whole day's total portions. Thus, these systems simply count and log the number of calories, cubs, protein, and fat utilized, leaving the user to determine whether meals and snacks consumed had the proper balance of each macronutrient based on the user's knowledge, which is likely to be low given that the user has turned to a system to improve his or her eating habits.

Like eating quality food, dietary balance is also necessary but not sufficient for metabolic healing and maintenance. Eating a broad variety of quality foods is another necessary component of a system for metabolic healing. For example, there are many types of healthy carbohydrates, including whole grains, legumes, starchy vegetables, leafy vegetables, crunchy vegetables (all other vegetables that are not starchy or leafy), and fruits. While all of these foods provide quality carbohydrates to the body, the nutrient profiles may vary broadly—for example, oats, potatoes, apples, and spinach are all carbohydrate foods, but all have different amounts of carbohydrate per unit and different combinations and amounts of vitamins, minerals, antioxidants, and fiber.

If healthy eating were limited to overall dietary balance, an individual could, in theory, choose to consume 100% of his/her daily carbohydrates as oatmeal. In so doing, the nutrient profile of total carbohydrate foods would be significantly limited compared to the aggregate nutrient profile of a broad array of carbohydrate foods consumed, for example, 20% oatmeal, 20% potatoes, 20% fruit, 20% broccoli, and 20% carbohydrates from other foods such as nuts, seeds, and dairy products. Similarly, there are different types of healthy fats, such as saturated, monounsaturated, and polyunsaturated, which include omega-3 and omega-6, and limiting one's diet to one type of fat would significantly limit the nutrient profile compared to a diet containing a variety of all types of healthy fats. Thus, the aggregate nutrient profile of a varied selection of foods vast exceeds the nutrient profile of just one food. FIG. 4 provides a visual schematic of this point.

In order to ensure proper balance and variety—that is, to determine the amounts of foods under different macronutrient categories to eat, for example, how much of each of type of macronutrient, a Portions System is critical. A Portions System tells the user how much of what to eat for his or her age, weight, level of activity, and unique metabolic needs. For example, a user's portions profile may include x portions of each macronutrient subcategory, as shown in FIG. 5.

Because, as noted above, combining carbohydrates, protein, and fats in each meal and snack is a critical component of healthy eating, a Portions System designed for metabolic healing also shows the user how to combine his or her portions to include carbohydrates, protein, and fats in each meal or snack in accordance with his or her unique metabolic needs, and keep track of his or her portions as they are consumed throughout the day. While some systems, such as Indiana University Health's "Carbohydrate Counting Food List" discussed earlier break down certain foods into defined portion sizes, as noted above, in the case of the Food List, most of the foods listed are unhealthy, and there is no guidance on how to use these foods and their corresponding portions in the context of a balanced, varied diet of healthy food.

Metabolic uniqueness, the final necessary component, acknowledges that in terms of nutritional requirements, there is no "one size fits all," because every person is metabolically unique. Metabolic uniqueness is most clearly illustrated by the fact that symptoms of metabolic damage may vary significantly among individuals with metabolic damage. Individual biochemistry, genetics, age, and weight affect individual nutritional requirements and, by extension the amount and balance of carbohydrates, protein, and fat in one's diet. To heal at the metabolic level, therefore, an individual must know how much of what to eat, and in what combinations, according to his or her unique metabolic needs.

The Portions System described herein provides a user with a customized Portions Profile that shows him or her how much of what to eat and in what combinations to effect metabolic healing, and when used in conjunction with a web application interface, enables the user to log and track his or her daily food.

The Portions System provides each user with a customized template showing the number of portions of each type of food to eat over a day that shows the user how to combine his or her portions to create healing meals and snacks, thereby providing a mechanism for eating in a way that effects deep metabolic healing; and is integrated with a web application interface that enables a user to enter food eaten, convert the food entered into portions, and add those portions to the user's Portions Profile.

FIG. 6 is an example of an unfilled. Portions Profile according to an embodiment of the present invention. Portion macro categories 601 include the five main portion categories in the Portions Profile: protein, carbs, fats, fluids, and cultured food/drink. A portion is a predefined quantity of each type of food. Portion categories 602 are food subcategories within the carbs and fats macro categories that include grain/legume, starchy vegetable, leafy vegetable, crunchy vegetable, fruit, and other carbs under the carbs macro category, and saturated, monounsaturated, omega-3, and omega-6 under the fats macro category. As shown, the protein, fluids, and cultured food/drink macro categories do not contain food subcategories.

In one embodiment, the numbers of daily portions in each category 604 are displayed, showing the percentage amount 603 of the daily portions consumed in each category, based on predetermined portion values. The predetermined portion values will be discussed in greater detail below. Portion units 603 correspond to the daily number of portions in each portion category. For instance, the Portions Profile shown in FIG. 6 contains 5.6 portions of "leafy vegetable" in the food subcategory located under the cubs macro category, and these portions are displayed as five bars and a partial bar representing 60% the size of a full bar. These bars are filled in as the user enters his or her food eaten into a web application interface, with the percentages of each food subcategory updated as foods are added. The details of the software application will be discussed in further detail below.

Table 3 below shows how portion values are computed. Portion categories are assigned a portion value based on macronutrient grams. The average number of calories corresponding to the number of grams that define the portion value is determined for each portion category. This information is used to compute the number of portions in each portion category for each Portions Profile. Note that the cultured food/drink macro category is not included in the table, because the cultured food or drink will be entered either as a fluid (for example, "probiotic drink," in which case the appropriate portions for both fluid and cultured food/drink will be filled in), or as a food (for example, "sauerkraut," in which case the appropriate portions for both leafy vegetable and cultured food/drink will be filled in).

TABLE 3

| Portion Macro Category | Portion Category | Grams per Portion | Calories per Portion |
|---|---|---|---|
| Protein | Protein | 10 | 100 |
| Carbohydrates | Grain/Legume | 20 | 110 |
|  | Starchy Vegetable | 17.5 | 85 |
|  | Leafy Vegetable | 5 | 10 |
|  | Crunchy Vegetable | 7 | 25 |
|  | Fruit | 15 | 60 |
|  | Other Carb | 15 | 75 |
| Fat | Fat (all types) | 9 | 100 |
| Fluids | Fluids | 12 oz. | 0 |

In one embodiment, there are 42 Portions Profiles in each of seven age categories based on metabolic factors. Metabolic factors comprise building, extra building, and balancing. Each metabolic factor has different ratios of macronutrient categories of carbs, proteins, and fats. In one embodiment, building comprises 32.5% carbs, 42.5% fat, and 25% protein. In one embodiment, extra building comprises 30% carbs, 45% fat, and 25% protein. In one embodiment, balancing comprises 40% carbs, 40% fat, and 20% protein.

For the building and extra building metabolic factors, the ratios of carbohydrates and proteins were reduced and the ratio of fats was increased in recognition of the fact that while carbohydrates are used by the body for fuel and proteins are used for building and repair of the body's biochemicals, fats are used for both fuel and building and repair. Because fats serve this dual role, a certain amount of carbohydrates and proteins may be replaced by fats and still provide the body with what it needs to achieve and maintain metabolic health. This is particularly salient in terms of carbohydrates, which the body converts to fuel in the form of glucose. In contrast, the body converts fat to fuel in the form of ketones, which are a cleaner source of fuel than glucose that does not contribute to free radical damage. As Joseph Mercola, M.D., notes, in "burning fat and ketones for fuel instead of glucose, your mitochondria's exposure to oxidative damage drops by as much as 30 to 40 percent compared to when your primary source of fuel is sugar (Mercola, M.D., Joseph. *Fat or Fuel.* 2017. pg. 9). As Dr. Schwarzbein notes, "When you digest carbohydrates, you break them down into sugar . . . Excess sugars in the bloodstream are more damaging to the human body than excess fats . . . because excess sugars cause more free radical formation, [which leads to] oxidation . . . [W]hen there is an excessive amount of free radicals in your body . . . your body is overwhelmed and cannot neutralize all the free radicals. This is when major changes to your metabolism occur" (*The Schwarzbein Principle II: The Transition.* 2002. pg. 99, 114). Protein levels were adjusted based on a Mayo Clinic report that from 10 to 35 percent of [one's] calories should come from protein (Dorfner, Micah, *Are you getting too much protein?* Mayo Clinic. Feb. 23, 2017). Given this broad range and the fact that increased fat in the Portions Profiles augments the materials for building and repair provided by protein, protein levels were adjusted to 25 percent for building and extra building and 20 percent for balancing.

A Portions Profile metabolic factor is a function of age and metabolic health. As noted previously, carbohydrates are used by the body for fuel in the form of glucose, protein is used by the body for building and repairing the biochemical that make up our bodies, and fat is used for both fuel and building and repair. As individuals age, they require greater building and repair to maintain their muscle mass and bone density, which a building or extra building Portions Profile provides. Similarly, the greater one's metabolic damage, the more his or her need for building and repair. Further, for certain individuals with symptoms of severe metabolic damage such as insulin resistance, Type II diabetes, *candida*, and chronic low energy, an extra building Portions Profile limits their consumption of higher-glucose-generating carbohydrates and their effect on blood sugar levels, while protein and fat provide materials for both building and repair and fat provides fuel that does not affect blood sugar.

It is a particular advantage of the present invention that, in addition to metabolic factors, Portions Profiles are based on a user's daily calories, because all foods comprise a certain number of calories. Table 4 shows the number of calories per weight group on which portions calculations are based.

To calculate portions, daily calories are first broken down by macronutrients. Daily calories for macronutrient categories are computed by multiplying total daily calories by carbohydrate, protein, and fat ratios. In one embodiment, the daily calories are based on the government dietary guidelines and on recommended calories based on age and physical activity level, sedentary, moderately active, and heavy active. Daily calories for macronutrient categories are computed based on the percentages listed above and calculated as follows:

$$\text{Macronutrient Carbohydrates} = (\text{Daily total calories}) \times (\text{Metabolic factor \% Carbs}) \quad (1)$$

$$\text{Macronutrient Fats} = (\text{Daily total calories}) \times (\text{Metabolic factor \% Fats}) \quad (2)$$

$$\text{Macronutrient Protein} = (\text{Daily total calories}) \times (\text{Metabolic factor \% Protein}) \quad (3)$$

For instance, a 95 lb. person in a 15-25 year old age group with a sedentary physical activity level has a daily recommended calories of 1,950; thus, for the building metabolic factor, the macronutrients would be calculated as follows:

$$\text{Macronutrient Carbs} = 1,950 \times 32.5\% = 633.8;$$

$$\text{Macronutrient Fats} = 1,950 \times 42.5\% \; 828.8; \text{ and}$$

$$\text{Macronutrient Protein} = 1,950 \times 25\% = 487.5.$$

Daily calories for carbohydrate and fat food subcategories are computed by multiplying macronutrient calories by carbohydrate and fat ratios shown below in Table 5.

TABLE 5

| Food Category Ratios | Building/Balancing | Extra Building |
|---|---|---|
| G/L | 0.15 | 0.125 |
| SV | 0.10 | 0.10 |
| Other | 0.33 | 0.295 |
| Fruit | 0.12 | 0.10 |
| Leafy | 0.08 | 0.10 |
| Crunchy | 0.22 | 0.28 |
| Sat | 0.30 | 0.30 |
| Mono | 0.35 | 0.35 |
| O-3 | 0.13 | 0.13 |
| O-6 | 0.22 | 0.22 |

$$\text{Daily Calories} = (\text{Macronutrient Calories}) \times (\text{Food Category Ratio}) \quad (4)$$

Using the above example of the 95 lb. person for the 15-25 year old age group for the building metabolic factor,

TABLE 4

| | | Portions Profile: | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Weight: Calories by Age Groups 1-7: | | 95 | 110 | 125 | 140 | 155 | 170 | 185 | 200 | 215 | 230 | 245 | 260 | 275 | 290 |
| 1 | 15-25 | 1,950 | 2,050 | 2,150 | 2,250 | 2,350 | 2,450 | 2,550 | 2,650 | 2,750 | 2,850 | 2,950 | 3,050 | 3,150 | 3,250 |
| 2 | 26-35 | 1,900 | 2,000 | 2,100 | 2,200 | 2,300 | 2,400 | 2,500 | 2,600 | 2,700 | 2,800 | 2,900 | 3,000 | 3,100 | 3,200 |
| 3 | 36-45 | 1,835 | 1,935 | 2,035 | 2,135 | 2,235 | 2,335 | 2,435 | 2,535 | 2,635 | 2,735 | 2,835 | 2,935 | 3,035 | 3,135 |
| 4 | 46-55 | 1,765 | 1,865 | 1,965 | 2,065 | 2,165 | 2,265 | 2,365 | 2,465 | 2,565 | 2,665 | 2,765 | 2,865 | 2,965 | 3,065 |
| 5 | 56-65 | 1,700 | 1,800 | 1,900 | 2,000 | 2,100 | 2,200 | 2,300 | 2,400 | 2,500 | 2,600 | 2,700 | 2,800 | 2,900 | 3,000 |
| 6 | 66-75 | 1,650 | 1,750 | 1,850 | 1,950 | 2,050 | 2,150 | 2,250 | 2,350 | 2,450 | 2,550 | 2,650 | 2,750 | 2,850 | 2,950 |
| 7 | 76-95 | 1,575 | 1,675 | 1,775 | 1,875 | 1,975 | 2,075 | 2,175 | 2,275 | 2,375 | 2,475 | 2,575 | 2,675 | 2,776 | 2,875 | the daily calories for grain/legume (G/L) would be 633.8× 0.15=95.07. The daily portions for each food subcategory are computed by dividing calories for each food subcategory by calories per portion. For instance, using the same example and utilizing Table 3, the daily portions for G/L would be 95.07/110=0.86, as calculated from the following equation:

Daily Portion=(Daily Calories for food category)/(Calories per portion)     (5)

FIG. 7 is a flow diagram illustrating how a user's Portions Profile is selected according to an embodiment of the present invention. The Portions Profile is based on a number of user queries. First, a user completes the web application registration 701 and is presented with a questionnaire 702 that includes queries for weight 703, age 704, and physical activity 705. The metabolic factor 706, such as building, extra building, or balancing, is determined by queries in the questionnaire. Based on the questionnaire and the details and examples discussed above, a Portions Profile is selected for the user 707.

FIG. 8 is a flow diagram illustrating how the Portions Profile is selected according to an embodiment of the present invention. The Portions Profile is based on a number of user queries. First, a user completes the web application registration 801 and is presented a questionnaire 802, including weight 803, age 804, and physical activity 805. In this embodiment, the weight depends on the user's current and ideal weight. If the current weight equals the ideal weight, the current weight 807 is used to determine the Portions Profile. If the current weight is within 30 lbs. of the ideal weight, the ideal weight 808 is used to determine the Portions Profile. If the current weight is greater than 30 lbs. more than the ideal weight, the current weight less 30 lbs. 809 is used to determine the Portions Profile. Similarly, in this embodiment, the ideal weight used to determine the Portions Profile is also determined by the user's physical activity level. If the user selects sedentary for the physical activity query, the ideal weight is not adjusted 810. If the user selects moderate for the physical activity query, the ideal weight is adjusted by an additional 8 lbs. 811. If the user selects heavy for the physical activity query, the ideal weight is adjusted by an additional 15 lbs. 812. The metabolic factor 806, such as building, extra building, or balancing, is determined by the questionnaire. Based on the questionnaire and the details and examples discussed above, a Portions Profile is selected for the user 813.

FIGS. 9A-B are flow diagrams 900 and 910, respectively, illustrating the factors that influence the selection of a Portions Profile for an individual user according to an embodiment of the present invention. As previously disclosed, in one embodiment, the weight 901 used to determine the Portions Profile is dependent on user queries 902, and specifically current weight 903 and ideal weight 904. Depending on the relationship between the current weight and ideal weight 905, as well as physical activity 906, the Portions Profile is selected using a specific weight 907 and age based on the user queries. The Portions Profile may be adjusted by a plurality of user queries 911 to determine the metabolic factor 912, either balancing, building, or extra building. The formulas below mathematically depict the algorithm described in FIGS. 9A-B to select a user's Portions Profile.

$$a = 1 \times 1_{\{15 \leq age \leq 25\}} + 2 \times 1_{\{26 \leq age \leq 35\}} + 3 \times 1_{\{36 \leq age \leq 45\}} + \quad (6)$$
$$4 \times 1_{\{46 \leq age \leq 55\}} + 5 \times 1_{\{56 \leq age \leq 65\}} + 6 \times 1_{\{66 \leq age \leq 75\}} + 7 \times 1_{\{76 \leq age \leq 95\}}$$

$$m = 1 \times 1_{\{(mq1=1) \wedge (mq2=1) \wedge (mq3=0) \wedge (mq4=0) \wedge (mq5=0) \wedge (mq6=0) \wedge (mq7=0)\}} + \quad (7)$$
$$2 \times 1_{\{(mq3=1) \vee (mq4=1) \wedge (mq5=0) \wedge (mq6=0) \wedge (mq7=0)\}} +$$
$$3 \times 1_{\{(mq5=1) \vee (mq6=1) \wedge (mq7=1)\}}$$

$$IW = IW + 8 \times 1_{\{mod=1\}} + 15 \times 1_{\{hea=2\}} \quad (8)$$

$$p = 1_{\{(CW-IW)=0\}} \times \quad (9)$$
$$\left\{ \left[ \left( \frac{CW - 94.99}{290 - 95} \right) \times 13 \right] + 1 \times 1_{\{95 + \left[ \left( \frac{CW-94.99}{290-95} \right) \times 13 \right] \times 15 - CW \} \leq 7\}} \right\} +$$
$$1_{\{0 < |CW-IW| \leq 30\}} \times$$
$$\left\{ \left[ \left( \frac{IW - 94.99}{290 - 95} \right) \times 13 \right] + 1 \times 1_{\{95 + \left[ \left( \frac{IW-94.99}{290-95} \right) \times 13 \right] \times 15 - IW \} \leq 7\}} \right\} +$$
$$1_{\{(CW-IW) > 30\}} \times \left\{ \left[ \left( \frac{(CW - 30) - 94.99}{290 - 95} \right) \times 13 \right] + \right.$$
$$\left. 1 \times 1_{\{95 + \left[ \left( \frac{(CW-30)-94.99}{290-95} \right) \times 13 \right] \times 15 - (CW-30) \} \leq 7\}} \right\}$$

$$p = p + 1 \times 1_{\{((mod=1) \vee (hea=1)) \wedge (c < 14)\}} \quad (10)$$

Where a=age group (1-7)
  m=the metabolic category (1, balancing; 2, building; 3, extra building)
  p=portions profile based on weight and physical activity (1-14)
  $1_{(logical\ condition)}$=indicator function for given "logical condition"; results in 1 if true, 0 otherwise
  mq1, mq2, . . . , mq7=responses to questions for determining metabolic type. E.g., mq1=1 means the answer to question 1 is yes, and mq3=0 means the answer to question 3 is no
  CW=current weight
  IW=ideal weight
  mod, hea=responses to questions for determining physical activity In equation (6), the age group (1-7) is determined using indicator functions with the relation of the user age to preset age ranges as the underlying logical conditions. In equation (7), the metabolic category (1-3) is determined using indicator functions with the user response to queries regarding metabolism as the underlying logical conditions. In equation (8), the ideal weight is increased by 8 lbs. or 15 lbs. using indicator functions with responses to physical activity (moderate and heavy, respectively) as the underlying logical conditions. In equation (9), the Portions Profile (1-14) is determined using indicator functions with the preset relationships between the current and ideal weights as the underlying logical conditions and an appropriately chosen weight (current weight, ideal weight, or current weight minus 30 lbs.). In equation (10), the portion category is incremented by one based on indicator functions with the user response to physical activity (moderate or heavy) as the underlying logical condition.

FIGS. 10A-C illustrate the structure of the Portions System web application interface 1000 that enables a user to enter foods eaten that will be converted to portions and added to the user's Portions Profile according to an embodiment of the present invention. The user enters foods based on Macro portion categories 1001 and the respective food categories under each Macro portion category 1002, as well as sauces and condiments 1003. Recipes 1004 can be created by combining ingredients and then entered all at once to streamline the process of adding commonly eaten meals and snacks to the web application interface. All of the aforementioned food categories enable the user to enter healthy foods eaten. Occasional "Oops" Foods 1005 are included with five food categories to enable a user to entered unhealthy foods, in recognition of the fact that very few users will eat all healthy food all of the time, especially when beginning to change their diet. As foods eaten are entered, they are displayed on the web application interface including food details 1006, serving size 1007, and the portions 1008 of the respective foods. The serving size is the quantity of the specific food the user eats in one sitting, which may be more or less than a portion of the food. Once the food and serving size are added 1009 using the web application interface, the Portions Profile 1010 is updated, and the portion units 1011 and 1012 are filled in. There is a particular advantage of the present invention, as the portion units 1012 visually show the user what has been eaten and in what combination, and what should be eaten over the remainder of the day to achieve his or her desired goals.

FIGS. 11A-B illustrate the entering and conversion to portions of unhealthy foods eaten according to an embodiment of the present invention, FIG. 11A shows the selection 1106 of chicken nuggets and a shake from the "Oops" Fast Food category and their corresponding portions 1108. When "Oops" foods are added 1109, the portions associated with the unhealthy food show in FIG. 11B 1110 are shown in a dark purple shade (not distinguishable in the drawing from the dark gray shade used to color in healthy foods), with a descriptive table 1113 in the lower left corner of the page that indicates the reasons the food is unhealthy. The table includes five unhealthy indicators, and any "Oops" food will have one or more of these indicators. This feature illustrates to the user clearly and unambiguously the poor quality of the food entered. The lighter shaded portions (shown in red in the actual user interface) filled in under the Other Carb subcategory indicate portions consumed that exceeded the portions allotted in the user's Portions Profile. In this example, the user consumed 7 plus a fraction of Other Carb portions, when the Portions Profile allows for 2.3 potions. In this case, the system fills the excess portions consumed in with a red color, with a "Careful!" notice at the end of the portion row.

In one embodiment, a recipe developer enables users to pre-enter ingredients to create recipes for commonly eaten meals and snacks, preview a serving of the recipe in the use's Portions Profile, and make necessary adjustments to the number of servings and/or the ingredients or amounts of ingredients in order to have an appropriate balance and broad variety of carbohydrates, protein, and fats.

FIGS. 11A-C illustrate the structure of the recipe developer 1200. The same interface is used to create a recipe as is used to enter individual foods or a recipe, with the exception that the user may not use "Oops" foods to create a recipe. Therefore, the "Oops" foods are not shown in the recipe developer. The user enters a name 1201 for the recipe and the number of servings 1202 the recipe makes. The user then selects foods from the healthy food categories 1203, 1204, 1205 that are included in the meal/snack for which the user is creating a recipe. The box with the alert "Remember: Magic Healing Formula=Carb+Protein+Fat" 1206 instructs the user to include carbohydrate, protein, and fat foods in the recipe to ensure balance and variety. The foods entered are then listed in the ingredient 1207, quantity 1208, and portion per serving 1209 fields. The user then previews one serving of the recipe in his or her Portions Profile 1210 to ensure the recipe has the appropriate macronutrient balance and food variety by viewing the portions filled in 1212. In this example, 33 percent more leafy vegetable is consumed than portions provided 1211. These excess portions are filled in with a green color that is not distinguishable in the drawing with an "Extra is Awesome!" notice. Contrary to the example in FIG. 11B, which showed excess portions of other carbs from chicken nuggets and a shake filled in with a red color, excess portions consumed in green indicate that the food category in which a food is overconsumed may be overconsumed without unhealthy consequences. Table 6 below shows the fill-in colors for excess portions consumed and message shown for each portions category.

TABLE 6

| Portion Macro Category | Portion Category | Fill-In Color for Excess Portions | Calories per Portion |
|---|---|---|---|
| Protein | Protein | Red | Careful! |
| Carbo-hydrates | Grain/Legume | Red | Careful! |
|  | Starchy Vegetable | Red | Careful! |
|  | Leafy Vegetable | Green | Extra is Awesome! |
|  | Crunchy Vegetable | Green | Extra is Awesome! |
|  | Fruit | Red | Careful! |
|  | Other Carb | Red | Careful! |
| Fat | Fat (all types) | Red | Careful! |
| Fluids | Fluids | Green | Extra is Awesome! |
| Cultured Food/Drink | Cultured Food/Drink |  | Extra is Awesome! |

FIG. 13 is a diagram 1300 explaining that Food Categories may affect more than one Portion Category and illustrating which Portion Categories are affected by foods in each Food. Category. For example, Legumes affect the Grain/Legume Carb Portion Category as well as the Protein category, and in very small quantities, the Omega-3 and Omega-6 Fat Portion Categories. This is a critical factor in balanced eating. Most users are unaware that all foods, except for pure oil, which is pure fat (but may still contain multiple types of fat), are some combination of the macronutrients. Without the Portions Profile as a visual aid and training tool, a user may unknowingly overconsume certain food categories because he or she does not understand that a food contains multiple macronutrients. For example, a user may eat a lot of legumes because legumes are an excellent source of vegetarian protein. However, because legumes have proportionally the same portions of carbohydrates as protein (in FIG. 13, legumes are shown as having two Primary portion categories), the user will not realize that one cup of most legumes provides both two protein portions and two carbohydrate portions. If the user has high blood sugar from symptoms of severe metabolic damage such as insulin resistance or Type II diabetes, the additional carbohydrates will be converted to excess sugar, which will affect the user's blood sugar levels and exacerbate the user's metabolic damage.

FIG. 14 is an architectural diagram of an Internet 1401 computer network system according to an embodiment of the present invention. The Internet-connected system comprises one or more Internet-connected servers 1402 executing the dietary Portions System 1400 software from nontransitory media. Server 1402 is connected to a data repository 1403, which may be any sort of data storage known in the art. The system further comprises a third party Internet-connected server 1404 connected to Internet backbone 1405. Although one third-party Internet-connected server 1404 is shown, it is understood that potentially millions of other similar servers are connected to the Internet via Internet backbone 1405. A number of users (1-$n$) 1406 are connected to the Internet-connected server via an Internet service provider (ISP) 1407, allowing users 106 to access the dietary Portions System.

The present invention is a radical departure from electronic food logging and tracking systems. Virtually all electronic food logging and tracking plans are based on a calorie orientation and are designed for weight loss. Thus, in response to a brief user query (usually one or two questions relating to the user's weight and height), these programs tell the user how many daily calories to eat to reach his or her weight goal or maintain his or her current weight and provide a user interface for recording and tracking the user's daily food. The user is then focused solely on eating such that he or she meets his or her daily calorie goal without attention to food quality, the variety of foods eaten, or how the foods eaten are combined in each meal or snack (i.e., the balance of the meal or snack). Calorie-oriented food-tracking programs also often provide a food database for the user to look up and select foods he or she has eaten that contain low-calorie, low-fat, fat-free, or other low-quality prepackaged foods, implying to the user that such foods are part of a healthy diet because they are not distinguished in any way from the healthy foods. In contrast, the Portions System is based on a portions orientation and is designed for deep metabolic healing and the elimination of or improvement in symptoms of metabolic damage.

The Portions System selects a Portions Profile from a database of 294 Portions Profiles based on the user's age, current weight, ideal weight, physical activity, and general metabolic health, the latter ascertained through a probing 11-question questionnaire.

The user's Portions Profile provides a specific number of portions in 13 food categories designed to maximize the variety of nutrients (vitamins, minerals, phytonutrients, and fiber) from the foods he or she eats.

The web application interface teaches the user how to combine the portions in his or her Portions Profile to create balanced meals and snacks.

The Portions System food database used to find and select foods eaten by the user contains both healthy and unhealthy foods, clearly distinguishing between the two so a user learns to identify unhealthy foods, is taught the impact of unhealthy foods on his or her health, and is motivated to transition to a diet comprising all or primarily healthy foods.

The techniques and process herein provide several novel characteristics not limited to a Customized Portions Profile, including a guide on what to eat to activate metabolic healing and eliminate or decrease metabolic symptoms, and a web application interface that selects a Portions Profile based on user queries and enables progress and meal tracking.

In some embodiments, the methods, systems, and devices described herein may be implemented on a web-browser and web server system, or on a remote Internet server that provides data to web browsers or apps running on smartphones, wrist-mounted computerized devices (e.g. Apple iWatch and equivalent), tablet computers, or other computerized devices.

In some embodiments, the web server may provide web pages or app data to remote computerized systems running web browsers or apps operated by remote users. The remote users may enter the user-specific data into their web browsers or apps, and the calculation load to implement the various algorithms described herein may be portioned between the web browsers/apps and the web servers as desired.

In other embodiments, the methods, systems, and devices described herein may be implemented as stand-alone programs or apps which may implement some or all of the various algorithms described herein.

In some embodiments, such as where the method is implemented on personally worn computerized devices, such as wrist-mounted computerized devices, or certain types of smartphone configurations, it may be useful to further monitor accelerometer data from the computerized devices to look for patterns of user motion consistent with eating, for example a repetitive motion such as might be associated with eating with utensils and the like. The devices may be further programmed to then prompt the user to enter in portion types and amounts when or soon after such eating associated motion is detected.

Alternatively or additionally, the methods described herein may also either automatically, or with user input, keep track of the user's body motion throughout the day (e.g. keep track of number of paces, and the like) and may adjust the user's nutritional needs up or down according to the amount of exercise that the user is estimated to have performed that day.

In other embodiments, the method may be implemented to prompt the user to take photographs of meals prior to eating. The method may then use automated vision recognition methods to at least partially fill in the various portion fields for that meal, and/or to double-check the user's entry of portion fields for that meal.

To assist in more accurately estimating nutritional content of either packaged foods or custom recipes, those computerized devices equipped with cameras may also be configured to take photographs of the UPC bar codes associated with the foods. The system may then correlate the bar codes with a database of nutritional compositions of the associated foods and allow the user the option to accept entries from this bar-coded database of nutritional compositions into the system.

To encourage user compliance, at least portable versions of the system may also be configured with the user's typical meal schedule, and may be configured to then remind the user to input data according to the user's typical schedule.

In other embodiments, the method may be implemented to enable a user to create daily menu plans consisting of meals and snacks that utilize the user's daily portions, and automatically generate a shopping list of the ingredients comprising the menu plans.

Although in some embodiments, the methods and devices described herein may be encoded into software, and then run on standard microprocessors, such as the popular ARM, x86, MIPS, MPSP430 series of microprocessors, in other embodiments, more specialized electronic circuits may be used. For example, custom integrated circuits with hardware dedicated only for the algorithms described herein, or field programmable gate arrays (FPGA) may also be used.

In other embodiments, the method may be implemented, provided, delivered, or in any other way conveyed to a user by way of book; mail-order paper system; manual or mechanical methodology, group setting such as class, seminar, workshop, and so forth; or any other electronic or non-online method.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, reference to "first," "second," "third," and etc. members throughout the disclosure (and in particular, claims) are not used to show a serial or numerical limitation but instead are used to distinguish or identify the various members of the group.

What is claimed is:

1. A dietary portions method, via a dietary Portions System, specifically for healing metabolic damage of a user, the method comprising steps:

(a) determining an age group of the user, wherein the age group is represented by a first numerical value a, calculated via a first formula:

$$a = 1 \times 1_{\{15 \leq age \leq 25\}} + 2 \times 1_{\{26 \leq age \leq 35\}} + 3 \times 1_{\{36 \leq age \leq 45\}} + 4 \times 1_{\{46 \leq age \leq 56\}} + 5 \times 1_{\{56 \leq age \leq 65\}} + 6 \times 1_{\{66 \leq age \leq 75\}} + 7 \times 1_{\{76 \leq age \leq 95\}};$$

wherein the first numerical value a equals 1, 2, 3, 4, 5, 6, or 7 corresponding to the age group of 15-25, 26-35, 36-45, 46-55, 56-56, 66-75, and 76-95, respectively;

(b) determining a metabolic factor of the user based on a list of health queries mq1, mq2, ... mq7, wherein the metabolic factor is represented by a second numerical value m, calculated via a second formula:

$$m = 1 \times 1_{\{(mq1=1) \wedge (mq2=1) \wedge (mq3=0) \wedge (mq4=0) \wedge (mq5=0) \wedge (mq6=0) \wedge (mq7=0)\}} + 2 \times 1_{\{(mq3=1) \vee (mq4=1) \wedge (mq5=0) \wedge (mq6=0) \wedge (mq7=0)\}} + 3 \times 1_{\{(mq5=1) \vee (mq6=1) \wedge (mq7=1)\}}$$

wherein the second numerical value not equals 1, 2; or 3 corresponding to the metabolic factor of building, balancing, and extra building, respectively;

(c) determining a physical activity level of the user based on a physical activity query, wherein the physical activity level is one of: sedentary, moderate, or heavy;

(d) determining an adjusted ideal weight IW value based on the physical activity query, a current weight CW value of the user, and an ideal weight IW value of the user, wherein if the physical activity level is sedentary the adjusted ideal weight IW value is equal to the ideal weight value, wherein if the physical activity level is moderate the adjusted ideal weight IW value is equal to the ideal weight value plus 8 lbs, and wherein if the physical activity level is heavy the adjusted ideal weight IW value is equal to the ideal weight value plus 15 lbs;

(e) determining a portions profile value from step (d), wherein the portions profile value is represented by a third numerical value p, calculated via a third formula:

$$p = 1_{\{(CW-IW)=0\}} \times \left\{ \left[ \left( \frac{CW - 94.99}{290 - 95} \right) \times 13 \right] + 1 \times 1_{\{(95 + [(\frac{CW-94.99}{290-95}) \times 13] \times 15 - CW) \leq 7\}} \right\} +$$

$$1_{\{0 < |CW-IW| \leq 30\}} \times \left\{ \left[ \left( \frac{IW - 94.99}{290 - 95} \right) \times 13 \right] + 1 \times 1_{\{(95 + [(\frac{IW-94.99}{290-95}) \times 13] \times 15 - IW) \leq 7\}} \right\} +$$

$$1_{\{(CW-IW) > 30\}} \times \left\{ \left[ \left( \frac{(CW-30) - 94.99}{290 - 95} \right) \times 13 \right] + 1 \times 1_{\{(95 + [(\frac{(CW-30)-94.99}{290-95}) \times 13] \times 15 - (CW-30)) \leq 7\}} \right\}$$

wherein the third numerical value p equals 1, 2, ... 14;

(f) determining a daily calories value for the user via the first numerical value a, the adjusted ideal weight IW value, and the third numerical value p from steps (a), (d), and (e) respectively;

(g) calculating dietary portions for the user, wherein the dietary portions consist of a macronutrient carbohydrates category, a macronutrient fats category, and macronutrient protein category, wherein the dietary portions are calculated from the second numerical value m, and the daily calorie value from steps (b) and (f) respectively;

(h) calculating a plurality of daily food calorie portions for the user from a plurality of food category ratios and the dietary portions from step (g), wherein the food category ratios are based on the second numerical value m from step (b);

(i) calculating a plurality of daily food portion categories for the user from the plurality of daily food calorie portions, wherein the plurality of daily food portion categories include a protein category, a grain/legume category, a starchy vegetable category, a leafy vegetable category, a crunchy vegetable category, a fruit category, and an extra carbs category, a saturated fat category, a monounsaturated fat category, an omega-3 category, an omega-6 category; a fluids category, and a cultured food/drink category;

(j) generating a visual daily Portions Profile for the user on the dietary Portions System, wherein the visual daily Portions Profile includes the plurality of daily food portion categories represented as portion units;

(k) filling in a percentage of the portion units corresponding to at least one food item; and (l) repeating step (k) until the portion units are completely filled and not exceeded to heal metabolic damage of the user.

2. The dietary portions method of claim 1, wherein in step (e), the third numerical value p is increased by one or two if the physical activity level of the user is moderate or heavy, respectively, from step (c).

3. A dietary portions method, via a dietary Portions System, specifically for healing metabolic damage of a user, the method comprising steps:

(a) determining an age group of the user, wherein the age group is represented by a first numerical value a, calculated via a first formula, wherein the first numerical value a equals 1, 2, 3, 4, 5, 6, or 7 corresponding to the age group of 15-25, 26-35, 36-45, 46-55, 56-56, 66-75, and 76-95, respectively;

(b) determining a metabolic factor of the user based on a list of health queries mq1, mq2, ... mq7, wherein the metabolic factor is represented by a second numerical value m, calculated via a second formula, wherein the second numerical value m equals 1, 2, or 3 corresponding to the metabolic factor of building, balancing, and extra building, respectively;

(c) determining a physical activity level of the user based on a physical activity query, wherein the physical activity level is one of: sedentary, moderate, or heavy;

(d) determining an adjusted ideal weight IW value based on the physical activity query, a current weight CW value of the user, and an ideal weight IW value of the user, wherein if the physical activity level is sedentary the adjusted ideal weight IW value is equal to the ideal weight value, wherein if the physical activity level is moderate the adjusted ideal weight IW value is equal to the ideal weight value plus 8 lbs, and wherein if the physical activity level is heavy the adjusted ideal weight IW value is equal to the ideal weight value plus 15 lbs;

(e) determining a portions profile value from step (d), wherein the portions profile value is represented by a third numerical value p, calculated via a third formula, wherein the third numerical value p equals 1, 2, ... 14;

(f) determining a daily calories value for the user via the first numerical value a, the adjusted ideal weight IW value, and the third numerical value p from steps (a), (d), and (e) respectively;

(g) calculating dietary portions for the user, wherein the dietary portions consist of a macronutrient carbohydrates category, a macronutrient fats category, and macronutrient protein category, wherein the dietary portions are calculated from the second numerical value m, and the daily calorie value from steps (b) and (f) respectively;

(h) calculating a plurality of daily food calorie portions for the user from a plurality of food category ratios and the dietary portions from step (g), wherein the food category ratios are based on the second numerical value m from step (b);

(i) calculating a plurality of daily food portion categories for the user from the plurality of daily food calorie portions, wherein the plurality of daily food portion categories include a protein category, a grain/legume category, a starchy vegetable category, a leafy vegetable category, a crunchy vegetable category, a fruit category, and an extra carbs category, a saturated fat category, a monounsaturated fat category, an omega-3 category, an omega-6 category; a fluids category, and a cultured food/drink category;

(j) generating a visual daily Portions Profile for the user on the dietary Portions System, wherein the visual daily Portions Profile includes the plurality of daily food portion categories represented as portion units;

(k) filling in a percentage of the portion units corresponding to at least one food item; and (l) repeating step (k) until the portion units are completely filled and not exceeded to heal metabolic damage of the user.

4. The dietary portions method of claim 3, wherein in step (e), the third numerical value p is increased by one or two if the physical activity level of the user is moderate or heavy, respectively, from step (c).

* * * * *